United States Patent
Kremer et al.

(10) Patent No.: US 6,895,394 B1
(45) Date of Patent: May 17, 2005

(54) METHOD FOR TRANSMITTING DATA AND IMPLEMENTING SERVER

(75) Inventors: Gilles Kremer, Vanves (FR); Patrick Chanudet, Asniéres (FR)

(73) Assignee: Magic Axess, Puteaux (FR)

( * ) Notice: Subject to any disclaimer, the term of this patent is extended or adjusted under 35 U.S.C. 154(b) by 0 days.

(21) Appl. No.: 09/530,775

(22) PCT Filed: Nov. 3, 1998

(86) PCT No.: PCT/FR98/02348

§ 371 (c)(1),
(2), (4) Date: Oct. 31, 2000

(87) PCT Pub. No.: WO99/23617

PCT Pub. Date: May 14, 1999

(51) Int. Cl.[7] .............................................. G06F 17/60
(52) U.S. Cl. .............................. 705/67; 705/75; 705/64
(58) Field of Search ............................ 705/67, 64, 75; 713/200, 201

(56) References Cited

U.S. PATENT DOCUMENTS 5,699,513 A * 12/1997 Feigen et al. ................ 713/201
6,342,834 B1 * 1/2002 Berube et al. ......... 340/539.11

FOREIGN PATENT DOCUMENTS

| JP | 410079732 A | * | 3/1998 |
| WO | WO96/00485 | * | 1/1996 |

OTHER PUBLICATIONS

IBM Technical Disclosure Bulletin; May 1, 1992; inter–process Message Communication security; vol. 34.*

* cited by examiner

Primary Examiner—Pierre Eddy Elisca
(74) Attorney, Agent, or Firm—Young & Thompson

(57) ABSTRACT

A data transmission method uses at least two communication networks to exchange data. The data transmission method on a first medium includes an operation for opening a communication session on the first communication medium and during the session, an operation for receiving confidential information on a single address terminal on a second communication medium, and an operation or transmitting, on the first communication medium, a confidential message representing the confidential information and an operation for verifying whether the confidential message corresponds to the confidential information.

6 Claims, 13 Drawing Sheets

METHOD FOR TRANSMITTING DATA AND IMPLEMENTING SERVER

BACKGROUND OF THE INVENTION

The present invention relates to a process for the transmission of information and a computer server using it. It permits ensuring that the person operating a terminal is an authorized or entitled person. It applies in particular to the verification of the identity of the person which has access to a remote service, no matter what terminal is used. It permits authenticating the identification of the user, authenticating the transaction, verifying the integrity of this transaction by completing it with the amount of said transaction, the quantity bought, the name of the product or service acquired, thereby to permit the payment for goods or services, on line, which is to say in the course of a communication between remote computer systems.

The fields of application of the invention are for example the control of access, the provision of confidential information to the proper party, the certification of transactions or payment for goods or services on a computer network.

The practice of remote transactions on a network poses, independently of encryption, the problem of authentication of the person doing it, of the integrity of the transaction and of its confidentiality. In numerous applications (electronic commerce, remote banking, telecommuting, internal security of enterprises, security of for-pay databases, for example) and on all supports (local or remote computer networks, for example, respectively, the community networks called "Intranet" or "Internet", voice servers, for example), this problem is crucial.

The security devices and processes known to the prior art, like those disclosed in U.S. Pat. No. 5,442,704, which use a memory card, impose important and costly material constraints.

Other software devices, based on encryption systems, ensure the confidentiality of the data without guaranteeing the authentification of the person.

Other devices using an authentification means, known as an "authentifier" or a "token", which computes from data received in the course of a transaction and from a secret key which it keeps in its memory, a dynamic password. These devices again require important and costly material constraints.

SUMMARY OF THE INVENTION

The present invention seeks to remedy these drawbacks. To this end, the present invention provides for the combined use of at least two communication networks.

In other words, the present invention proposes the transmission, to a user of a first communication support, of confidential information, on a second information support, preferably secured, with:

a mechanism for synchronizing two communications on the two networks, and a return operation, from one communication support to the other, under the initiative of the user, preferentially manual acquisition, of confidential information received on the other support.

To this end, the present invention provides, according to a first aspect, a process for the transmission of data on a first transmission support, characterized in that it comprises:

an operation of opening a communication session with a remote communication means, on said first transmission support, and, during said session:

an operation of receiving confidential information on a terminal with a single address on a second transmission support, and a transmission operation, on the first transmission support, of a confidential message representing said confidential information.

The present invention provides, according to a second aspect, a method for the transmission of information on a first transmission support, characterized in that it comprises:

an operation of opening, by means of a terminal with a single address on said first transmission support, a communication session with a remote communication means, and, during said session:

an operation of receiving confidential information on the first transmission support, and an operation of transmission, on a second transmission support, of a confidential message representative of said confidential information.

The present invention provides, according to a third aspect, a process for the transmission of information on a first communication support, characterized in that it comprises:

an operation of opening, by means of a first terminal, a communication session with a remote communication means, on said first communication support, an operation of opening, by means of a second terminal, a communication session with a remote communication means, on a second communication support, when the two session are open, an operation of receiving confidential information on said communication supports on which one of the terminals has a single address, and an operation of transmission, on another of said communication supports, of a confidential message representing said confidential information.

The present invention provides, according to a fourth aspect, a method for the transmission of information on a first transmission support, characterized in that it comprises:

an operation of opening a communication session with a remote communication means, on said first transmission support, and, during said session:

an operation of generating confidential information and transmitting said confidential information on a second transmission support to a terminal having a single address on the second support, an operation of receiving, on the first transmission support, a confidential message adapted to be representative of said confidential information, and an operation of verifying the correspondence between said confidential message and said confidential information.

The present invention provides, according to a fifth aspect, a process for the transmission of information on a so-called "second" transmission support, said transmission support forming a part of a communication network, characterized in that it comprises:

an operation of receiving, from a so-called "second" terminal, a first message representing:

an identifier of a so-called "third" terminal having a single address on said network, confidential information, information representative of the amount of the transaction, a transmission operation, to the third terminal, of a second message representing:

said confidential information and said amount, an operation of receiving a third message, from said second terminal, representing a transaction validation, and an incrementation operation of a register corresponding to said third terminal, by a value representative of said amount of the transaction.

The present invention provides, according to a sixth aspect, a process for the transmission of information on a so-called "second" transmission support, said transmission support forming a part of a communication network, characterized in that it comprises:

an operation of receiving, from a so-called "second" terminal, a first message representative:

of an identification of said "third" terminal having a single address on said network, confidential information, information representative of an amount of a transaction, a transmission operation, to the third terminal, of a second message representative:

of said confidential information and of said amount, an operation of receiving a third message, from said second terminal, representative of a validation of a transaction, and an operation of incrementing a register corresponding to said third terminal, by a value representative of a duration of the first session.

It will be noted that, according to the fifth and sixth aspects of the invention, the incrementation operation can take place before or after the operation of receiving the third message.

The present invention provides, according to a seventh aspect, a method for the transmission of information on a so-called "second" transmission support, said transmission support forming a part of a communication network, characterized in that it comprises:

an operation of receiving, from a so-called "second" terminal, a first message representative:

of an identification of a so-called "third" terminal having a single address on said network, of confidential information, of information representative of an amount of a transaction, an operation of transmitting, to the third terminal, a second message representative:

of said confidential information and of said amount, an operation of incrementation of a register corresponding to said third terminal, by a predetermined value.

The present invention provides, according to an eighth aspect, a method for the transmission of information, between a first terminal and a second terminal, on a first transmission support belonging to a communication network, characterized in that it comprises:

an operation of opening a communication session, on the first transmission support, between the first terminal and the second terminal, and an operation of transmitting, from the second terminal to a third terminal connected to a second network and having a single address on said second network, a first message representative of confidential information, an operation of transmitting, to the third terminal, a second message representative of said confidential information, and an operation of transmitting, on the first transmission support, from the first terminal and to the second terminal, of a message representative of confidential information.

In each of the aspects of the present invention, the user, on the one hand, and the transaction, on the other hand, are thus authenticated because the transmission of confidential information, at the initiative of the user, proves his identity by the reception of this confidential information. Moreover, the engagement of the user in the two communications, proves the use of the two terminals, simultaneously, by the same user.

When one of the used networks is a mobile communication network, the practice of the invention is entirely portable, which is to say that it can be applied no matter where, by the user of the mobile communication network.

Moreover, the invention can be practiced with no matter what terminals and is independent of the material used. It does not require any adaptation of existing terminals, nor modification, nor addition of peripherals.

The simplicity of the practice of the present invention renders the tasks of authentication, billing and payment intuitive, and it does not require any apprenticeship.

It will also be noted that the confidential information can be a password or a transaction certificate.

According to particular characteristics of each of the aspects of the present invention described above:

the confidential information is representative of a pseudo-random number, the confidential information is representative of a session number attributed to a session, the confidential information is representative of the identity of the user, the confidential information is representative of one or several bank and/or card account numbers, the confidential information is representative of the time and date of said operation of opening the session, and/or the confidential information is modified at each of the sessions.

Thanks to each of these arrangements, the confidential information is renewed at each session and its use is limited to a single communication session.

According to particular characteristics of each of the aspects of the invention set forth above:

in the course of the reception operation of confidential information on a terminal with a single address on a second communication support, there is received moreover an amount of the transaction, and/or in the course of operation of transmission of a confidential message representative of confidential information, there is moreover transmitted an amount of the transaction.

Thanks to each of these arrangements, the invention permits transactions using financial amounts, such as purchases, reservations, exchanges, loans, mortgages, guarantees . . . .

According to a ninth aspect, the present invention provides a method for the transmission of information on a first communication support which is part of a communication network, characterized in that it comprises:

an operation of receiving, from a first terminal, a first message representative:
of an amount of an envisaged transaction,
of an identification of the debtor,
a transmission operation, on a second communication support, to a bank server, of a second message representative:
of said amount,
of an identification of said debtor,
of a demand for approval of the debit,
an operation of receiving or not from said bank server, a third message representative of an authorization of the debit,
when the authorization is approved, an operation of transmission, to a second terminal having a single address on the second communication network, of a fourth message representative of confidential information,
of a reception operation, from said first terminal, of a fifth message representative of said confidential information,
of an operation of verifying the correspondence between the confidential message and the confidential information.

This ninth aspect of the present invention has the same advantages as the first and second aspects. These advantages are not repeated here.

According to particular characteristics of each aspect of the invention, after the operation of verifying the correspondence, in the case of correspondence, the process provided by the present invention, as set forth succinctly above, comprises an operation of incrementing from one account to the debit of said debtor.

Thanks to these arrangements, a statement corresponding to each amount of the transaction carried out by the debtor, can be sent to him.

According to other particular characteristics of each of the processes envisaged by the different aspects of the present invention, this process comprises, after the operation of receiving the first message, an operation of reading, in a database, of the single address of the second terminal on the second network.

Thanks to these arrangements, the debtor needs only furnish this address, on the one hand, and this address is certified, on the other hand.

According to other particular characteristics of each of the methods envisaged by each of the different aspects of the present invention, this process comprises, after the operation of receiving the first message, a reading operation, in a database, of an identification of said bank server.

Thanks to these arrangements, the debtor needs not supply this identification, nor a bank card, on the one hand, and this identification can be preliminarily verified, on the other hand.

According to a second aspect, the present invention provides a method for the transmission of information on a first communication support forming a portion of a communication network, characterized in that it comprises:

an operation of receiving, from a first terminal, a first message representative:
of the amount of a proposed transaction,
of an identification of a debtor,
an operation of authorizing or not a debit on a bank account,
when the authorization is approved, an operation of transmission, to a second terminal having a single address on a second communication network, of a second message representative of confidential information,
a reception operation, from said first terminal, of a third message representative of said confidential information,
an operation of verifying the correspondence between the confidential message and the confidential information, and
in the case in which the correspondence is verified, an operation of debiting said amount on said bank account.

According to particular characteristics of each of the aspects of the method provided by the present invention, the latter comprises an operation of manual acquisition, in the course of which the user acquires a confidential message representative of the confidential information.

Thanks to these arrangements, the engagement of the user is guaranteed by the manual acquisition which he carries out.

According articular characteristics of each of the aspects of the method provided by the present invention, the latter comprises an operation of selection of transmission, in the course of which, of a function of predetermined criteria, the transmissions are classified into two groups, one relating to so-called "security" transmission and the other to so-called "normal" transmissions, the normal transmissions requiring no more than one transmission operation on a communication support.

Thanks to these arrangements, the process provided by the present invention is practiced only for a portion of the transmissions, as a function of predetermined criteria.

According to particular characteristics of each of the aspects of the method provided by the present invention, in the course of said selection operation, there is used a transaction limit amount, the so-called "secured" transmissions being those with which are associated the higher transaction amounts than said limit amount.

Thanks to these arrangements, the criterion of selection of the transmissions which are secured by the practice of the present invention are those which relate to transaction amounts greater than the limit amount.

According to particular characteristics of each of the aspects of the method provided by the present invention, the latter comprises a transmission operation of a single address on one of said networks.

According to particular characteristics of each of the aspects of the method provided by the present invention, in the course of said transmission operation of a single address, there is transmitted a certificate containing information representative of said single address.

Thanks to each of these arrangements, it is the user himself or, respectively, his computer, which, in an encrypted mode or not, transmits on one of the networks a single address which it has on one of the networks that is used.

According to particular characteristics of each of the aspects of the process provided by the present invention, said certificate responds to a security protocol for payment and comprises information representative of said single address.

Thanks to these arrangements, the single address transmitted with the certificate is protected by the security payment protocol.

The present invention also provides a memory, erasable or not, which contains instructions of a program adapted to be executed by a processor and adapted to use the transmission process as succinctly set forth above.

The present invention moreover relates to a computer server, characterized in that it is adapted to use the transmission process as succinctly set forth above.

This tenth aspect, this server and this memory having the same particular characteristics and the same advantages as the nine first aspects of the present invention, set forth above, the latter are not repeated here.

BRIEF DESCRIPTION OF THE DRAWINGS

Other advantages, objects and characteristics of the present invention will become apparent from the description which follows, given with respect to the accompanying drawings, in which.

DESCRIPTION OF THE PREFERRED EMBODIMENTS

Figure 1:
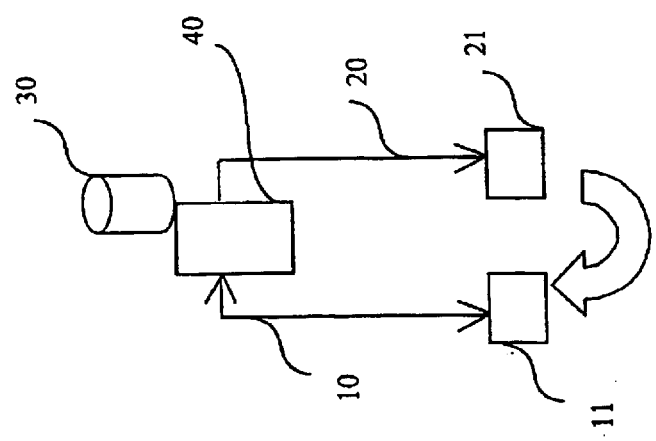
FIG. 1 is a diagram of the principle of the process of the present invention.

In FIG. 1 are shown:
a first network 10,
a first terminal 11 of the first network,
a second network terminal, also called hereinafter "data and message server" 40,
a second network 20,
a third terminal 21 of the second network, and
a data server 30.

According to the invention, the user of the first terminal 11 is identified by his single address on the second network 20.

The latter is preferably secured, which is to say that each address is there certified by a third party guarantor, and, moreover, the information transmitted is confidential. The third person in question is preferably a telephone operator, or, more generally, any organization which has a database for the user of a single address terminal.

Figure 2:
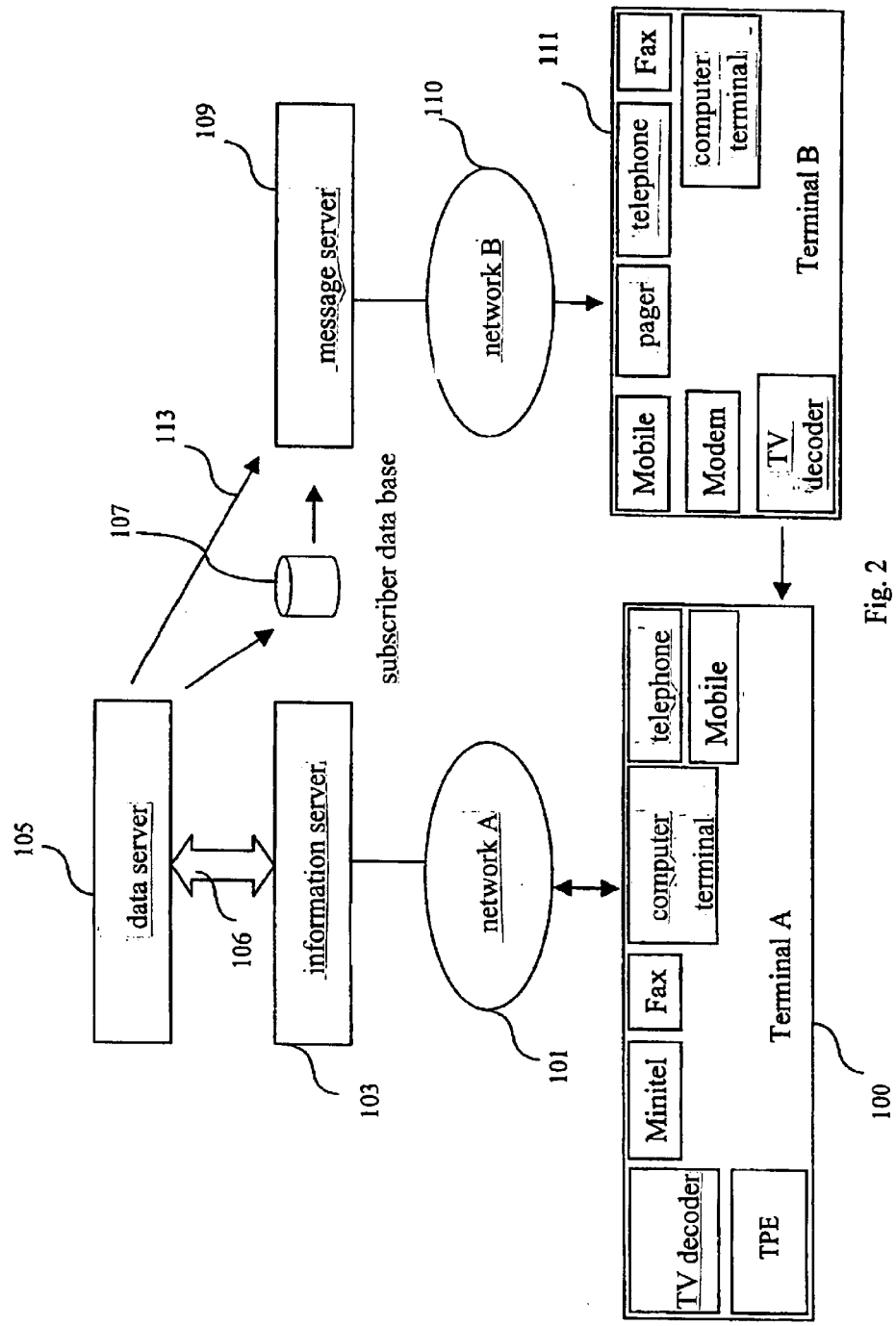
FIG. 2 is a particular diagram for the practice of the present invention.

The terminal of the first network 11 can be for example a telephone, a computer terminal, a telecopier, a telematic terminal, a televisor provided with a box adapted to receive and emit computer data (a box commonly called a television decoder), an electric payment terminal (FIG. 2).

The terminal 21 of the second network can for example be a telephone, a telecopier, a telematic terminal, a television decoder, a mobile telephone or a message receiver ("pager") or a personal digital assistant (commonly called "PDA").

In a first embodiment of the present invention, in a first instance, the user uses the terminal 11 of first network 10 to enter into communication with the data server 30. He thus opens a communication session between terminal 11 and the second terminal 40 of the network. Then, the information server 30 supplies confidential information to the user, by means:
of the server 40 of data and messages,
of the second network 20, and
of the terminal 21 of the second network.

Finally, the user receives confidential information at the level of the terminal 21 of the second network and carries out a manual acquisition of a confidential message, constituted here by confidential information, to transmit it to the information server 30, in the course of the same session, by means:
of the terminal 11 of the first network and
of the first network 10.

The data and message server 40 then verifies the correspondence of the confidential message and the confidential information, which is to say whether the confidential message is representative of the confidential information, and, in case of correspondence, it gives access to the particular services, paid services or confidential services.

The user, on the one hand, and the transaction, on the other hand, are thus authenticated because the manual acquisition proves the identity of the user who receives the confidential information as well as simultaneous use of the two terminals by the same user.

In FIG. 2 are shown:
a first terminal, called "user" 100 connected to a first communication support 101 forming a portion of the communication network;
an information server 103, connected to the first information support 101;
a data server 105, connected by a telecommunication line 106 and/or a computer line 106 to the information server 103;

a message server 109, connected by a second communication support 110 to a receiver 111 and by a third communication support 113, to the data server 105; and a contract database 107 connected to the message server 109 and to the data server 105.

In the embodiment described and shown here, the user terminal 100 is a personal computer (commonly called "PC") or a network computer (commonly called "NC"), or else a Minitel (trademark) which comprises a modem connected to a wire telecommunication network, for example the public switched telephone network (PSTN). The first communication support 101 is thus a channel of this telecommunication network. The user terminal 100 uses communication software of known type, which permits it to communicate remotely with the information server 103, by means of the communication support.

The information server 103, connected to the first information support 101, is a computer server of known type, which is here adapted to use a specific software, according to the invention (shown in one of FIGS. 4 to 13).

The data server 105 is a computer server of known type which operates as is indicated below, relative to the information server 103, by means of the line 106, itself also of known type.

The message server 109 is a computer system of known type which manages one or more communication networks of the known type, a channel of one of these networks constituting a second communication support. A specialized channel supplies the third support 113 for communication between the information server 103 and the message server 109.

The contract database 107 is a memory register of known type.

It will here be noted that the contract database 107 can be connected directly to several computer systems:

to that of the service supplier in the case of a network external to a business, in particular in certain cases for the use of the present invention with a contract preliminary to the user of the service, in business, in the case in which the network is internal to the business, to one of a bank or a guarantor, in particular in the case of use of the invention without a contract.

Finally, in certain cases, the database is not necessary, the single address on the second network being supplied, on the first network, either by a certificate or payment stored in the station (or "computer") client, or by the user himself.

The second communication support 110 is a communication network of known type. On this second network, each receiver has a single address which is certified at the time of attribution of the address from the receiver 111.

The receiver 111 is, in the embodiment described and shown here, a portable telephone (commonly called "mobile") or a message receiver (commonly called "pager"), a facsimile machine or a fixed telephone or terminal provided with a modem. It is adapted to receive a confidential message and to place it at the disposition of the user, for example by display on a screen, spoken emission or printed on paper. As a variation the information servers 103 and the message server 109 are combined.

It will here be observed that:

in the case in which the receiver 111 serves the user only as a receiver of confidential information without emitting a confidential message, it is not necessary that it permits emission on the network 110, moreover, when, according to certain modifications of the present invention, the receiver 111 serves on the one hand to receive confidential information and on the other hand to admit a confidential message, it is necessary that it permits emission on the network 110.

Figure 3:
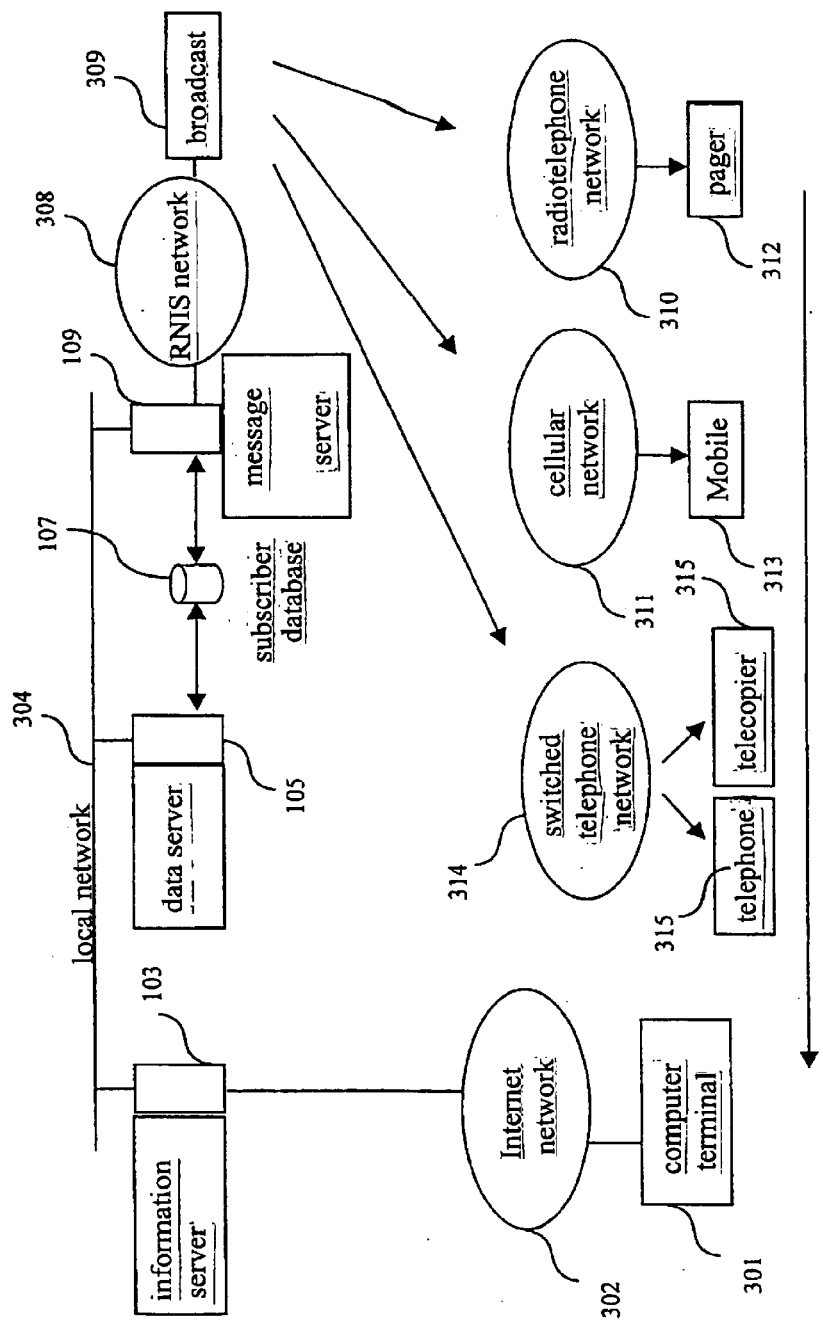
FIG. 3 shows the system architecture adapted to support the practice of the present invention.

In FIG. 3, there will be noted, in a material and software architecture permitting the use of the present invention:

a computer terminal 301, a computer network 302, an information server 103, a local network 304, a data server 105, a database 107, a message server 109, a network 308, a diffusion means 309, a radiotelephone network 310, a cell phone network 311, an alphanumeric message receiver 312 (called a "pager"), a mobile phone 313, a switched network 314, and a telephone or facsimile machine 315.

The computer terminal 301 is for example a microcomputer known by the term "PC". It comprises a modem permitting communication by emission and reception, with the computer network 302. The computer network 302 is in this case the worldwide computer network known by the term "Internet". The information server 103 is of known type for the practice of supplier sites of services on the network 302.

The local network 304 is of known type. It is a business network, for example of the LAN Manager (trademark) Netware (trademark of the NOVELL company, this name also being a trademark).

The data server 105 and message server 109 are of known types. The database 107 is of known type.

The network 308 is of known type, for example of the digital network with service integration ("DNSI").

The diffusion means 309 is a radiowave emitter of a type known for the use of the mobile communication network 310. It is for example cellular or by satellite.

In the embodiment described and shown in FIG. 3, at least one of the three following communication networks is used:

the radiotelephone network 310 which permits only communication in the direction of diffusion from an emitter toward alphanumeric message receivers such as the receiver 312, without these being able to emit long distance signals, the mobile telephone network 311, permitting communication in particular with mobile phones, such as the telephone 313, and a switched network 314 here permitting the communication with a fixed telephone or fixed facsimile machine 315.

These three networks operate under subscription, with certification of the identity of the contracting party. On each of these networks, the receiver has a single address, which is to say that the address which is attributed to it is not attributed to another receiver (except in certain cases of group contracts required by the user). This single address is embodied by a telephone number and/or an SIM card number (acronym of "Subscriber Identity Module"), which module secures the identification of the portable, for example, in the case of a mobile telecommunication network known by the name "GSM" (acronym of "Global System for Mobile").

It will here be observed that the apparatus adapted to function on the GSM network utilizes a microprocessor card. This card supplies the particular modes of the invention which permit it to operate with double security.

In the case shown in FIG. 3, it is preferably the same user who uses the computer terminal 301, on the one hand, and the alphanumeric receiver 312, the mobile phone 313, the fixed telecopier or the fixed telephone, on the other hand.

FIGS. 4 to 9 show different applications of the present invention, using the same formula: in each of these figures, the operations are shown from top to bottom, in the order of their chronological succession. In these figures are shown:

in the vertical column to the left and in the form of rectangles, the operations carried out by the user, using either the terminal connected to the first communication support ("terminal A") or the terminal connected to the second communication support ("terminal B"), the terminal used being inscribed in a lozenge with which the rectangular representing the operation in question is superposed;

in a central column, successive transmissions of information on one or the other communication support ("A" for the computer network 302 or "B" for the telecommunication network for the networks 308, 310, 311 and/or 314), in the form of arrows whose direction corresponds to the direction of communication, which is to say the direction left to right, corresponding to the direction user toward server and the direction right to left corresponds to the direction server to user.

Figure 6:
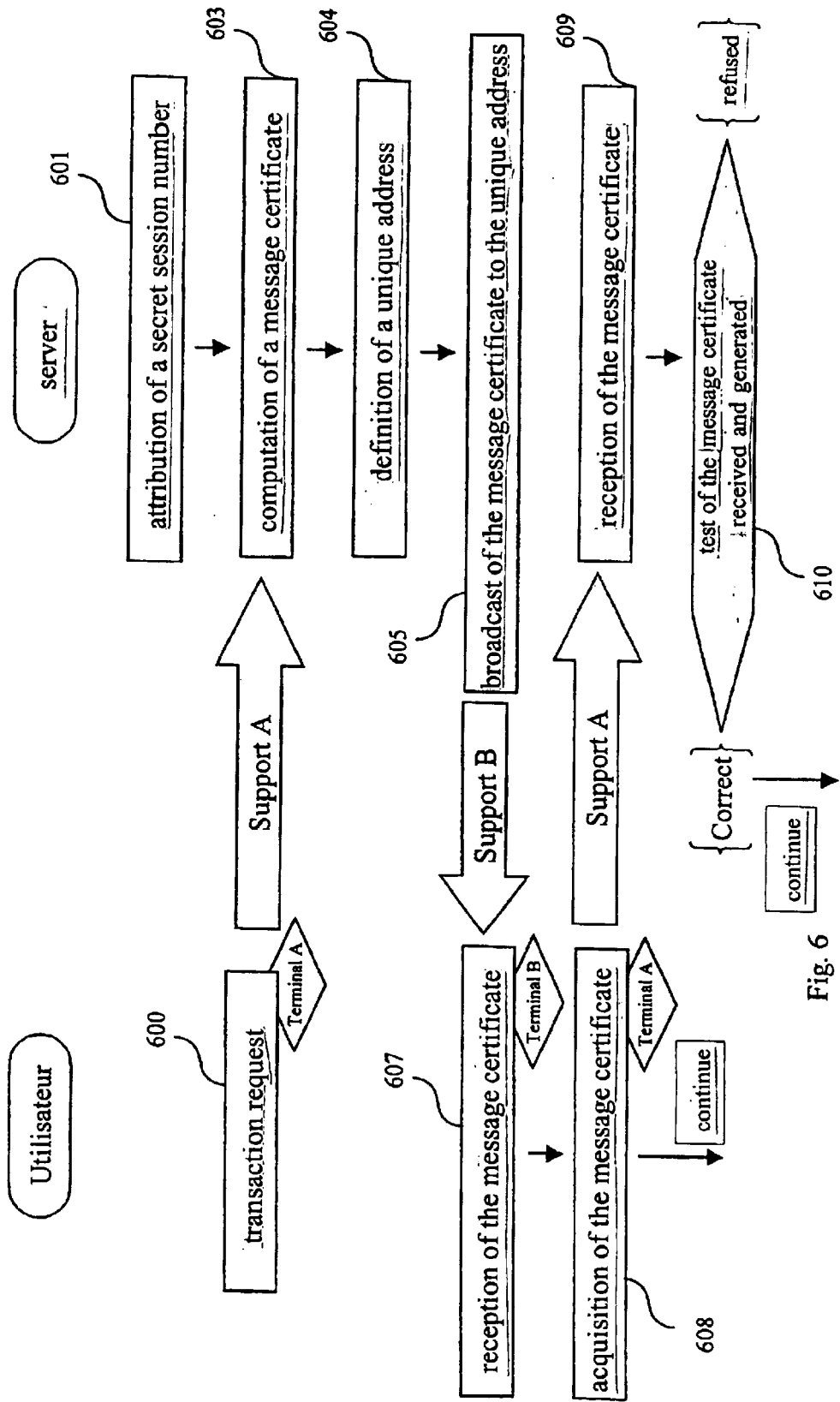
FIG. 6 shows a series of operations used by the elements shown in FIGS. 2 and 3, in the framework of a use of the present invention for the certification of messages.
Figure 7:
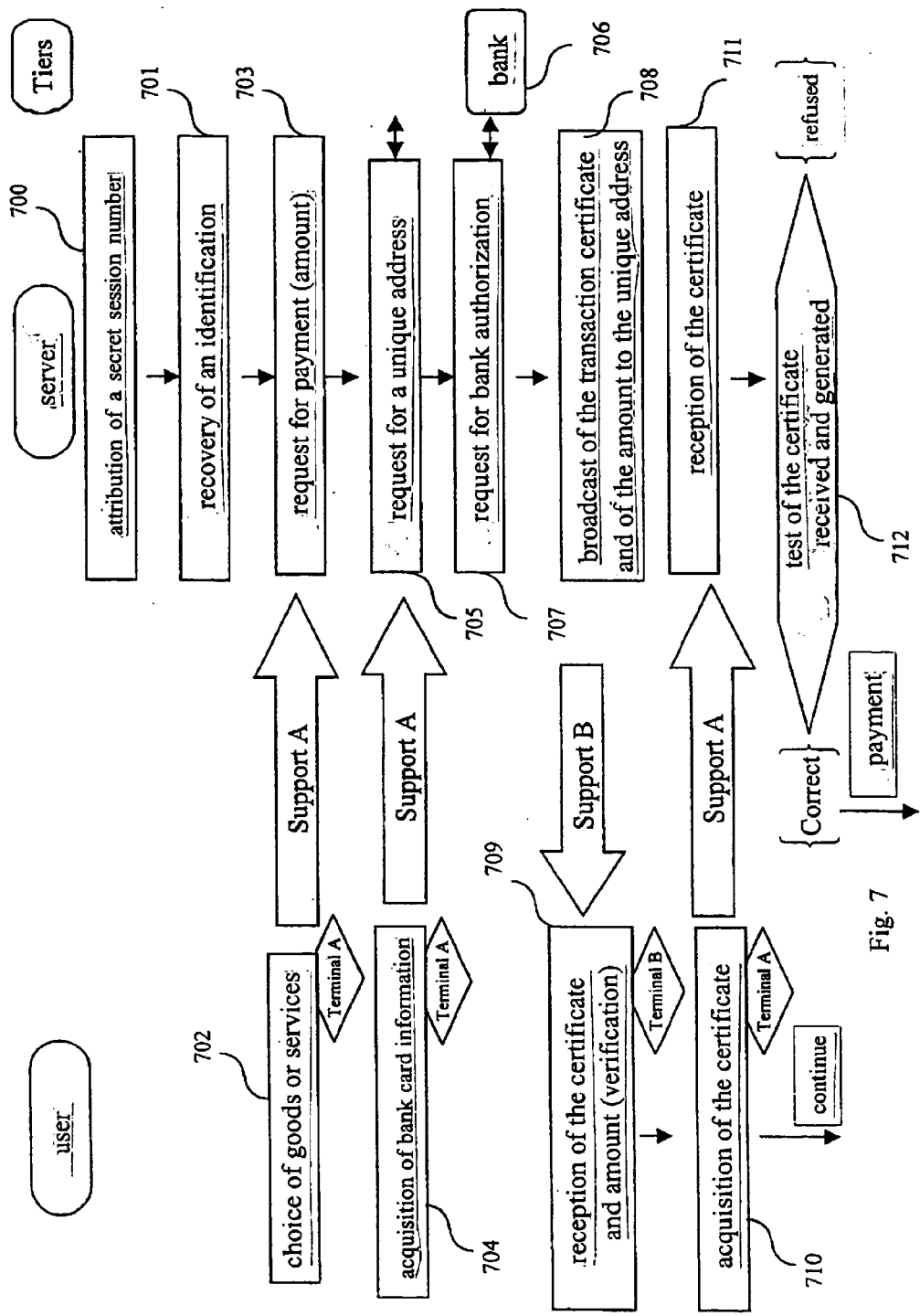
FIG. 7 shows a sequence of operations used by the elements shown in FIGS. 2 and 3, in the framework of the application of the present invention to electronic line payment, in the case of service without a contract.
Figure 8:
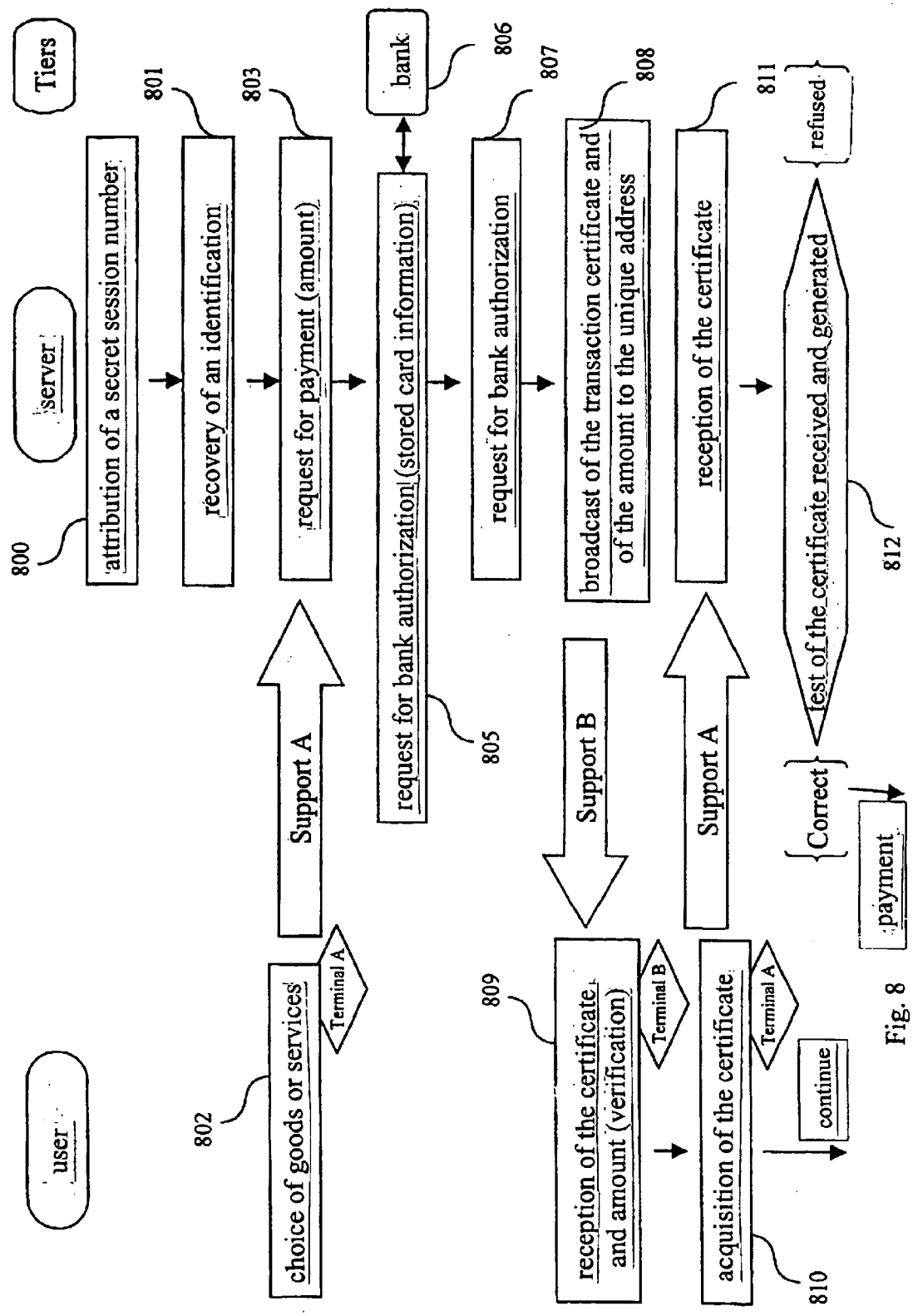
FIG. 8 shows a sequence of operations practiced by the elements shown in FIGS. 2 and 3, in the framework of the use of the present invention for electronic on-line payment, in the case of contract service.
Figure 9:
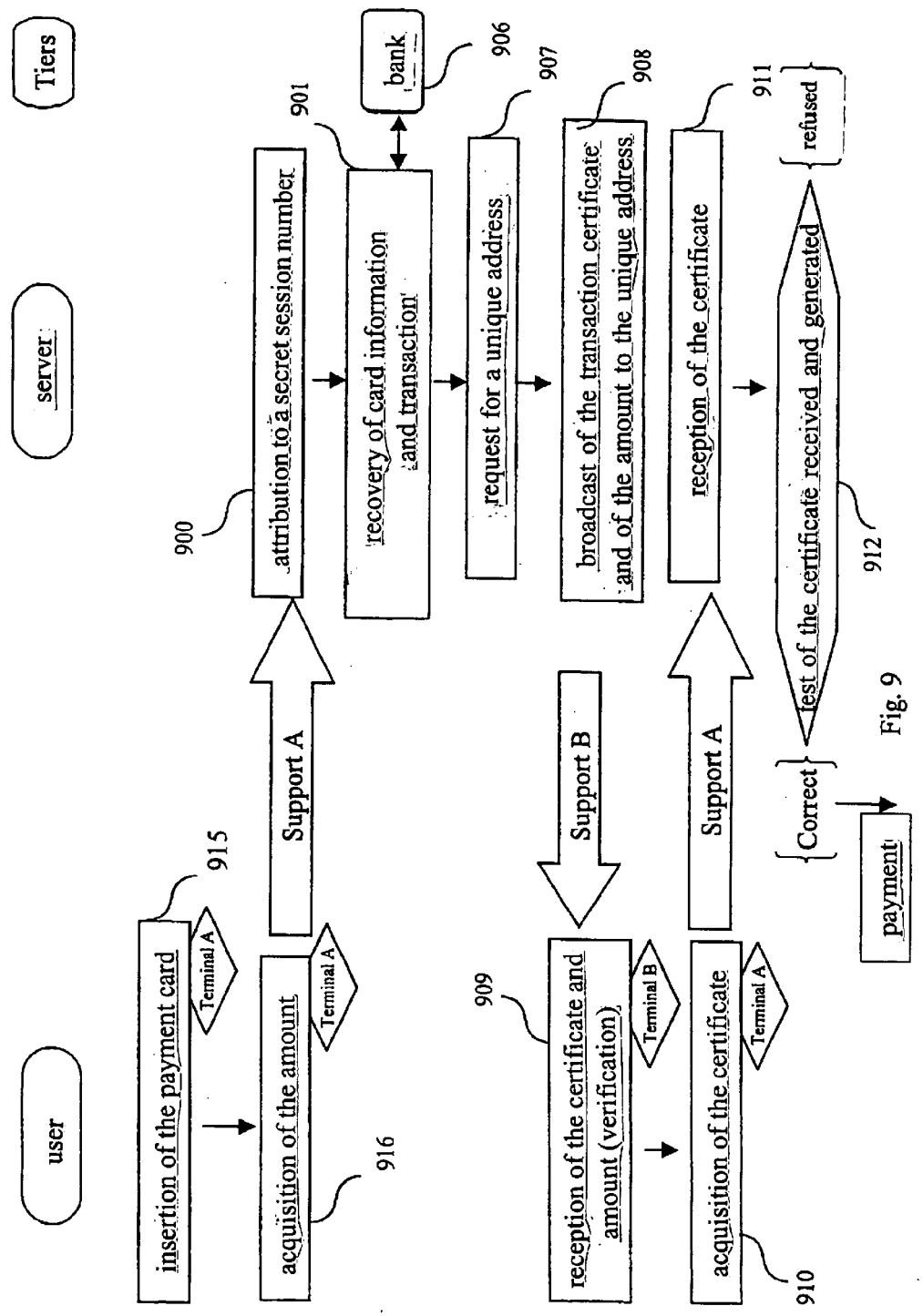
FIG. 9 shows a sequence of operations practiced by the elements shown in FIGS. 2 and 3, in the framework of the use of the present invention for payment with a known electronic payment terminal.
Figure 10:
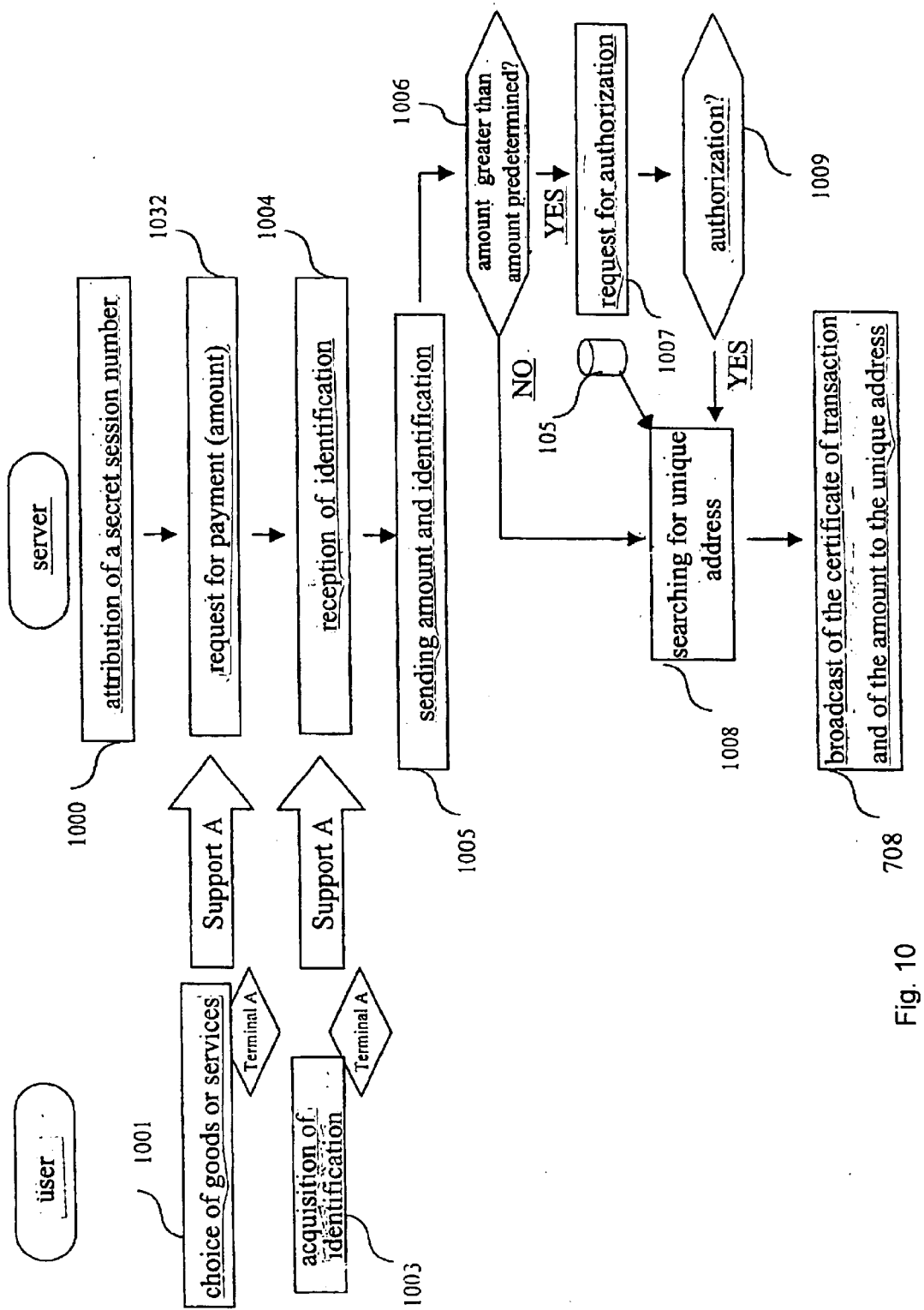
FIG. 10 shows a sequence of operations practiced by the elements shown in FIGS. 2 and 3, in the framework of another application of the present invention to electronic online payment with a trustee, in the case of non-contract service.

It will here be noted that for each transmission of information, several signals can be exchanged between the electronic system used (synchronization, selection of communication protocol, information, redundancies, acknowledgement of transmission, retransmission in case of transmission error, . . . ). According to these arrows, the server "A" corresponds to the first network and the server "B" to the second network;

on a vertical column more to the right than the two preceding ones (the right-most in FIGS. 4 to 6 and 9), in the form of rectangles, the operation is carried out by data server 105; and in FIGS. 7, 8 and 10, in a vertical column located right-most, a server placed in communication with the data server 105.

Figure 4:
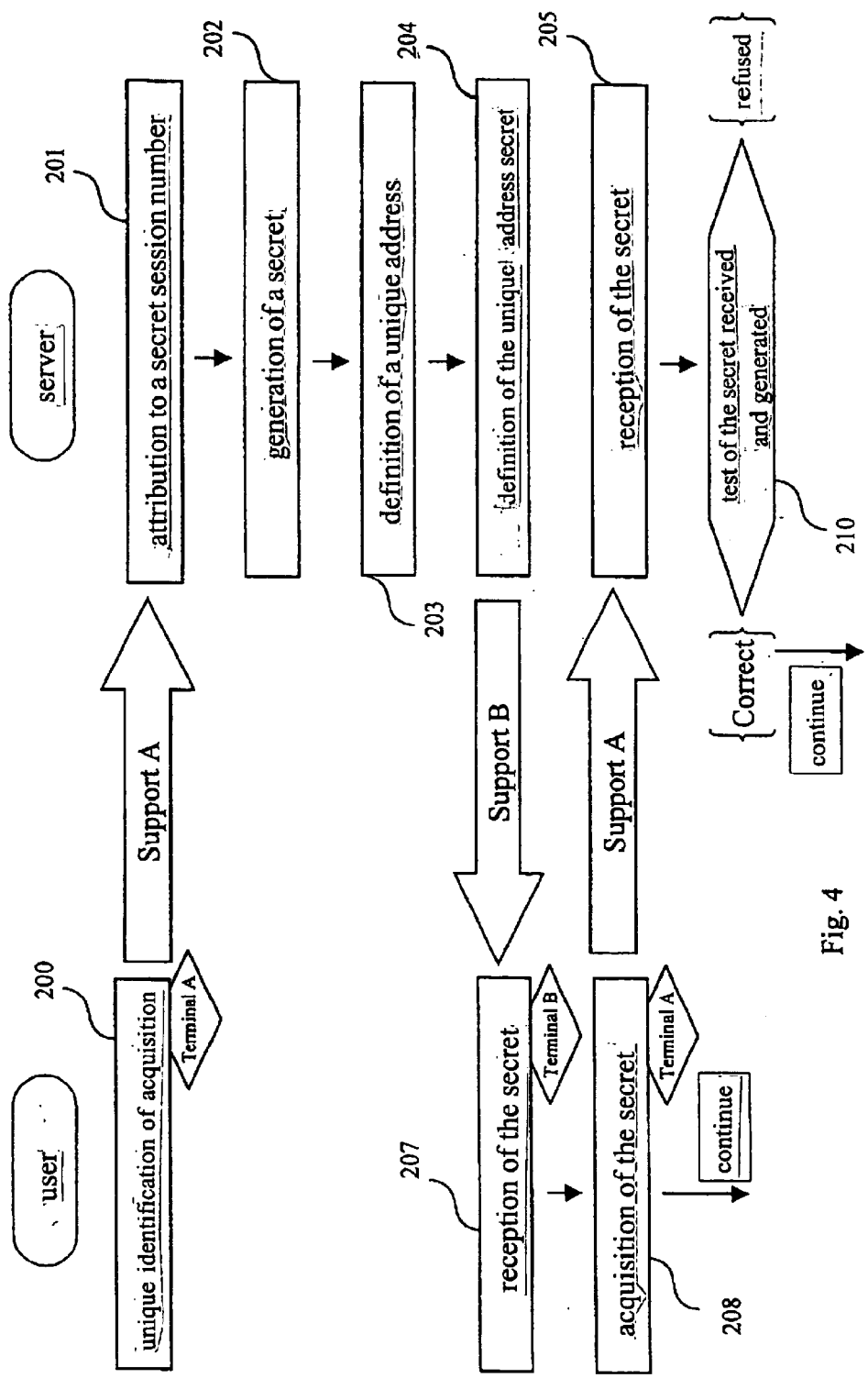
FIG. 4 shows a succession of generic operations used by the elements shown in FIGS. 2 and 3.

In FIG. 4, there will be noted a sequence of operations used in certain applications of the invention, by the elements illustrated in FIGS. 2 and 3:

in the course of an operation 200, the user of the user terminal 101 enters into communication with the information server 103, by means of the first communication support. In the course of this operation 200, it supplies a unique identifier (for example a subscriber number, a name or physical address);

in the course of operation 201, the information server 103 attributes a unique session number upon reconnection of the "user" terminal 100 to the information server 103. In the course of this operation 201, the information server 103 transmits the identifier to the data server 105;

in the course of operation 202, the data server 105 computes confidential information also called hereafter "secret", to the message server 109. To this end, the data server 105 calculates the secret as being a representation of an algorithm function using an invariable (which is to say a value which does not vary from one session to the other, as an identifier, for example), a variable (which is to say a value which varies with each session), to avoid repetitions (session number for example) and a time marker (which is to say a clock value) so as to limit the use of a secret time-wise. Preferably, it uses a function for working out confidential information (or "secret"), which is irreversible, which is to say from which input information cannot be retrieved when the output information is known. For the practice of operation 202, the reader could refer to well-known security algorithm books, in particular to the descriptions of the functions known as "hashing", "Message Digest", and "SHA";

the operation 203 takes several different forms according to the identifier which is already in the database or not: if so, the single address there is read; in the negative, recourse is had to a confidential third person, who is, in this case, the operator of the second network or any other organism entitled to play the role of a confidential third party;

in the course of operation 204, the unique address of the receiver 111 is determined: it is representative, in the database 107, of the identifier transmitted by the information server 103 to the message server 109, in the course of operation 203;

in the course of operation 204, the message server 109 transmits, by means of the network 110, the confidential information transmitted in the course of operation 203 to the receiver 111 which possesses said unique address;

in the course of operation 207, the confidential information, here also called "secret", is supplied to the user, either by being displayed on the display of the receiver 111, or by being given in a vocal or by facsimile manner;

in the course of operation 208, the user supplies to the information server 103, which itself transmits to the data server 105, a confidential message representative of the confidential information (for example identical to this confidential information or "secret"), by means of the user terminal keyboard 100;

in the course of operation 205, the information server 103 receives this confidential message;

in the course of test 210, the data server 105 determines whether the confidential message is representative of the confidential information generated by the data server 105, in the course of the operation 202, or not;

when the result of test 210 is negative, the data server 105 transmits, to the user, an error message, by stating if desired a cause of the mishap (too much time elapsed between the transmission of confidential information and its reception, . . . ) and the access to the protected resources is refused to the user.

Finally, the course of the session opened on the first communication support is of known type, but thanks to the use of the present invention, the user is precisely authenticated.

It will here be noted that, even if the secret were to be known, because this secret corresponds to a unique session numeral attributed dynamically by the information server 103 and because the session remains open (connected mode) until the secret is sent, this secret could not be used to carry out fraudulent operations. Thus, any new open session will then be attributed to another secret.

Figure 5:
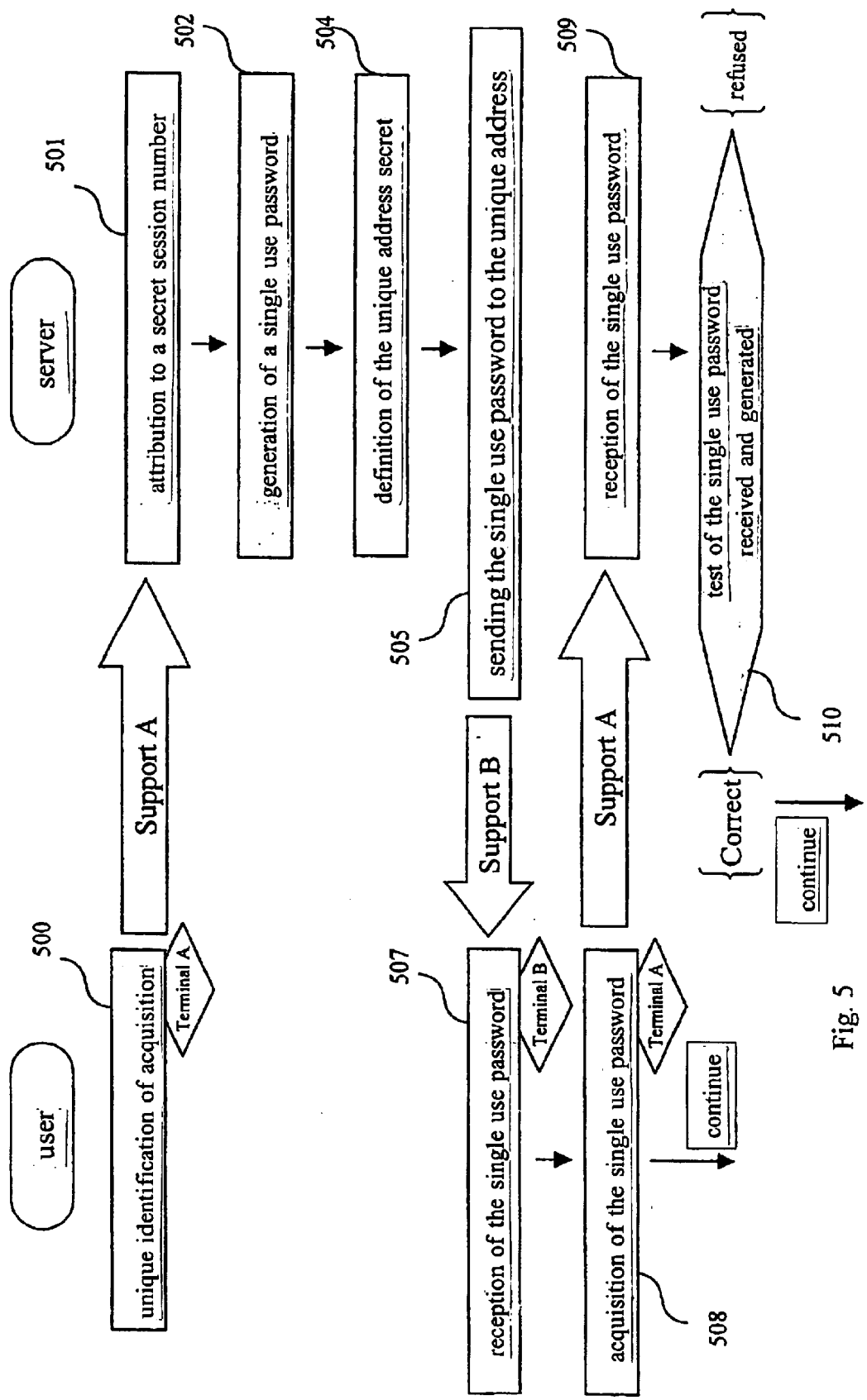
FIG. 5 shows a succession of operations used by the elements shown in FIGS. 2 and 3, in the framework of the application of the present invention to authentication.

In FIG. 5, is shown a sequence of operations used by the elements shown in FIGS. 2 and 3, in an application of the invention to the authentication, by access to protected data:

in the course of an operation 500, the user of the user terminal 101 enters into communication with the information server 103, by means of the first communication support. In the course of this operation 500, he supplies a unique identifier (for example a subscriber number, a name, or a physical address);

in the course of operation 501, the information server 103 attributes a unique session numeral upon connection of the user terminal to the information server 103. In the course of this operation 501, the information server 103 transmits the identifier to the data server 105;

in the course of operation 502, the data server 105 calculates confidential information also called in what follows "discardable password", to the message server 109. To this end, the data server 105 calculates the confidential information from an invariable (the identifier, for example), of a variable to avoid repetitions (session number, for example) and of a time marker (clock) so as to limit the use of a secret time-wise. Preferably, it uses an irreversible confidential information computation function, which is to say from which input information can be retrieved only when the output information is known. For the practice of this operation 102, the reader could refer to the books mentioned above;

in the course of operation 504, the unique address of the receiver 111 is determined: it is representative, in the database 107, of the identifier transmitted by the information server 103 to the message server 109, in the course of operation 503;

in the course of operation 505, the message server 109 transmits, by means of the network 110, the confidential information also here called "disposable password", in the course of operation 503 of the receiver which has said unique address;

in the course of operation 507, the confidential information, also here called "discardable password" is supplied to the user, either by being displayed on the display of the receiver 111, or by being given orally or by telecopy;

in the course of operation 508, the user supplies to the information server 103, which itself retransmits it to the data server 105, a confidential message representative of the confidential information (for example identical to this confidential information, or "discardable password"), by means of the keyboard of the user terminal 100;

in the course of operation 509, the information server 103 receives this confidential message;

in the course of test 510, the data server 105 determines whether this confidential message is representative of the confidential information generated by the data server 105, in the course of operation 503, or not;

when the result of test 510 is positive, the data server 105 invalidates the access to the protected information;

when the result of test 510 is negative, the data server 105 transmits an error and access invalidation message, by stating if desired a cause of failure (too much time elapsed between the transmission of the confidential information and its reception, . . . ) and access to the protected information is refused.

Finally, the end of the session is of known type.

In FIG. 6, there is shown a sequence of operations used by the elements shown in FIGS. 2 and 3, in an application of the invention to message certification:

following a session opening operation, not shown, between the user terminal 100 and the information server 103, in the course of operation 601, the information server 103 attributes a unique session number;

in the course of an operation 600, the user of the "user" terminal 100 initiates, on the first communication support, a transaction procedure (for example inter-account transfer, payment command or order) (see above with respect to FIG. 4);

in the course of operation 603, the data server 105 computes confidential information also called in what follows "certificate of message" from an invariable (the identifier, for example), from a variable to avoid repetitions (session number, for example) and from a time marker (clock) so as to limit the use of a secret time-wise. Preferably, it uses an irreversible confidential information calculating function, which is to say information cannot be retrieved from the inlet when that of the outlet is known. For practice of the operation 603, the reader could refer to the books mentioned above;

in the course of operation 604, the unique address of the receiver 111 is determined: it is representative, in the database 107, of the identifier transmitted by the information server 103, to the message server 109, in the course of operation 603;

in the course of operation 605, the message server 109 transmits, by means of the network 110, the confidential information also here called "message certificate", transmitted in the course of operation 603 to the receiver 111 which has said unique address;

in the course of operation 607, the confidential information, here called "message certificate" is supplied to the user, either by being displayed on the display of the receiver 111, or by being given orally or by telecopy;

in the course of operation 608, the user supplies to the information server 103, which itself retransmits it to the data server 105, a confidential message representative of confidential information (for example identical to this confidential information or "message certificate"), by means of the keyboard of the user terminal 100;

in the course of operation 609, the information server 103 receives this confidential message;

in the course of test 610, the data server 105 determines whether this confidential message is representative of confidential information generated by the data server 105, in the course of operation 603, or not;

when the result of test 610 is positive, the data server 105 validates the transaction carried out, and then restarts;

when the result of test 610 is negative, the data server 105 transmits an error message and invalidates the transaction, by pointing out if desired a failure cause (too much time elapsed between the transmission of the confidential information and its reception, . . . ) and does not carry out the transaction.

Finally, the end of the session is of known type.

According to a variation (not shown):

in the course of operation 603, the "message certificate" is also determined, by the data server 105, from an amount of a transfer and/or a bank account number emitter and/or a bank account number receiver, in the course of operation 605, the message server 109 transmits, by means of the network 110, a confidential information and the amount of the transfer, in the clear and, more generally, information representative of the transaction carried out (product or service acquired and quantity involved); and in the course of operation 607, the confidential information as well as the amount are supplied to the user who verifies the integrity of the amount of the transfer taking place.

In FIG. 7, there is seen a sequence of operations performed by the elements shown in FIGS. 2 and 3, in an application of the invention to electronic in-line payment, in the case of a service without a contract:

following a session-opening operation, not shown, between the user terminal 100 and the information server 103, in the course of operation 700, the information server 103 attributes a secret unique session numeral;

in the course of an operation 701, the information server 103 receives from the user terminal 100, an identification;

in the course of an operation 702, the user of the user terminal 101 selects the goods or services which he desires to buy, then institutes a payment procedure (see above with respect to FIG. 4);

in the course of operation 703, the data server 105 receives the payment request from the user terminal 100;

in the course of operation 704, the user supplies to the information server 103 confidential information concerning his payment card;

in the course of an operation 705, the unique address of the receiver 111 is determined: it is representative, in the database 107, of the identification transmitted by the information server 103 to the message server 109, in the course of operation 701;

in the course of operation 707, the data server 105 carries out a request for bank authorization to the server 106 from a bank where the user has an account to which is associated the payment card involved in operation 704. The data server 105 supplies the amount of the transaction envisaged to the bank server 706. The information server 103 receives, in turn, from the bank server 706, a payment authorization, according to the bank modalities of known type which depend in particular on the conventions shared by the bank and the client in question and the eventual authorization debiting said account (see the protocol known to those in the art under the name "BCAS" for "Bank Card Authorization System");

in the course of an operation 708, the information server 103 computes confidential information also called "transaction certificate" from:

an invariable (the identification, for example), from a variable to avoid repetitions (session number, for example), from the amount of the transaction, and from a time marker (the clock) so as to limit the use of a secret time-wise.

Preferably, he uses a function for irreversibly calculating confidential information, which is to say of which the input information cannot be retrieved when the output information is known. To use operation 708, the reader can refer to the books mentioned above. In the course of this operation 708, the transaction certificate and the amount of the transaction envisaged are sent, by means of the network 110, to the receiver 111 which possesses said unique address;

in the course of operation 709, the confidential information, also called "certificate of transaction" is placed at the disposition of the user, conjointly to the amount of the transaction, in clear, either by being displayed on the display of the receiver 111, or by being given verbally or by facsimile, which permits the control, by the user, of the integrity of the transaction that he carries out;

in the course of operation 710, the user supplies to the information server 103, which, itself, retransmits it to the data server 105, a confidential message identical to (or as a modification, representative of) the confidential information constituted by the transaction certificate, by means of the keyboard of the user terminal 100;

in the course of operation 711, the information server 103 receives this confidential message;

in the course of test 712, the data server 105 determines whether the confidential message is representative of the confidential information generated by the data server 105, in the course of operation 708, or not;

when the result of test 712 is positive, the data server 105 validates the payment carried out, this payment being effectively carried out between the bank entities according to known techniques, then resumes the operation of presenting commercial offers;

when the result of test 712 is negative, the data server 105 transmits to the user an error message and invalidates the payment, by specifying if desired a malfunction (too much time elapsed between transmission of the confidential information and its reception, . . . ) and the payment is not carried out.

Finally, the end of the session is of known type.

As a variation of the embodiment shown in FIG. 7, the operation 707 is carried out after all the other operations, but before the end of the session.

In FIG. 8, there is seen a sequence of operations carried out by the elements shown in FIGS. 2 and 3, in an application of the invention to the electronic in-line payment in the case of a subscriber service;

following the session-opening operation, not shown, between the user terminal 100 and the information server 103, in the course of operation 800, the information server 103 attributes a unique secret session numeral;

in the course of an operation 801, the information server 103 receives from the user terminal 100, an identification;

in the course of an operation 802, the user of the user terminal 101 selects goods or services of which he wishes to have the benefit, then starts a payment procedure (see above with respect to FIG. 4);

in the course of operation 803, the data server 105 receives the payment request from the user terminal 100;

in the course of operation 805, the data server 105 carries out, preferably in a secure manner, a request for bank authorization to the server 106 from a bank at which the user has an account with which is associated the payment card involved in the operation 804. It supplies the amount of the transaction envisaged to the bank server 806 as well as the data concerning the payment card, these data being preserved by the information server 103 on the account of the user of the service in question. The information server 103 receives, in return, from the bank server 806, a payment authorization, according to the bank modalities which depend on the amount available in the bank account in question and on the possible authorization of debiting said account;

in the course of an operation 807, the unique address of the receiver 111 is determined: it is representative, in the database 107, of the identification transmitted by the information server 103 to the message server 109, in the course of operation 801;

in the course of operation 808, the information server 103 computes confidential information also called "certificate of transaction" (see FIG. 7);

in the course of operation 809, the confidential information, also called "certificate of transaction" is supplied to the user, conjointly with the amount of the transaction, in clear, either by being displayed on the display of the receiver 111, or by being given in an oral or telecopied manner, which permits the control of the integrity of the transaction by the user;

in the course of operation 810, the user supplies to the information server 103, which itself retransmits it to the data server 105, a confidential message identical to or as a modification, representative of, the confidential information constituted by the certificate of transaction, by means of the keyboard of the user terminal 100;

in the course of operation 811, the information server 103 receives this confidential message;

in the course of test 812, the data server 105 determines whether this confidential message is representative of confidential information generated by the data server 105, in the course of operation 808, or not;

when the result of test 812 is positive, the data server 105 validates the payment carried out, this payment being then effectively carried out between the bank entities according to known techniques, then resumes the operation of presenting commercial offers;

when the result of test 812 is negative, the data server 105 transmits to the user an error message and invalidation of the payment, by stating if desired a cause of failure (too much time elapsed between the transmission of confidential information and its reception, . . . ) and the payment is not carried out.

Finally, the end of the session is of known type.

As a variation of the embodiment shown in FIG. 8, the operation 805 is carried out after all the other operations, but before the end of the session.

In FIG. 9, there is seen a sequence of operations carried out by the elements shown in FIGS. 2 and 3, in an application of the invention to the payment with an electronic payment terminal:

in the course of operation 915, the user introduces his payment card into an electronic payment terminal ("EPT") which constitutes the so-called "user" terminal;

in the course of operation 916, the merchant acquires the amount of the transaction on said EPT;

in the course of operation 900, an opening of the session is carried out between the EPT 100, and the information server 103 and a unique and secret session numeral is attributed by the communication server 103;

in the course of operation 901, the information server 103 receives from the EPT 100, information carried by the payment card as well as the amount of the transaction in progress, and the information server transmits a demand for identification of the customer at the bank entity 906 and receives this information by return;

in the course of operation 907, the unique address of the receiver 111 is determined: it is representative, in the database 107, of the identification transmitted in the course of operation 901;

in the course of operation 908, the information server 103 computes confidential information also called "certificate of transaction" (see FIG. 7);

in the course of operation 909, the confidential information, also called "certificate of transaction" is supplied to the user, conjointly with the amount of the transaction, in clear, either by being displayed on the display of the receiver 111, or by being given orally, which permits the control of the integrity of the transaction by the user;

in the course of operation 910, the user supplies to the information server 103, which itself retransmits it to the data server 105, a unique confidential message with, or as a modification, representative of, the confidential information constituted by the certificate of transaction, by means of the keyboard of the EPT 100;

in the course of operation 911, the information server 103 receives this confidential message;

in the course of test 912, the data server 105 determines whether this confidential message is representative of the confidential information generated by the data server 105, in the course of operation 908, or not;

when the result of test 912 is positive, the data server 105 validates the payment carried out, this payment being then carried out between the bank entities according to known techniques;

when the result of test 912 is negative, the data server 105 transmits to the user an error message and invalidation of the payment, by stating if desired the cause of failure (too much time elapsed between the transmission of confidential information and its reception, . . . ) and the payment is not effectuated.

A modification of operation 916 is the acquisition by the user of his personal code also called "PIN" (acronym of "Personal Identification Number"), before starting operation 900.

Finally, the end of the session is of known type and the client recovers his payment card as well as a printed ticket bearing the amount of the payment carried out.

In FIG. 10, there is seen a sequence of operations performed by the elements shown in FIGS. 2 and 3, in an application of the invention to the electronic in-line payment, using a trustee, in the case of a service without a subscription, a different application from that shown in FIG. 7.

In this application, the data server 105 is preferably located with the message server 109, and forms a portion with the latter of the trustee (also called the certifier). By way of example, these two services 105 and 109 are located with the telecommunication operator.

In this application, the operations used are carried out successively in the following manner.

Following a session-opening operation, not shown, between the user terminal 100 and the information server 103, in the course of an operation 1000, the information server 103 attributes a secret unique session numeral. In the course of operation 1001, the user of the user terminal 101 selects goods or services which he desires to purchase, then initiates a payment procedure, in cooperation with the information server 103.

The information server 103 thus receives, in the course of an operation 1032, a payment request, and, in particular, an amount of the transaction envisaged.

In the course of an operation 1003, the user of the user terminal 101 supplies an identification and, in the course of an operation 1004, the information server 103 receives this identification from the user terminal 100.

In the course of an operation 1005, the information server 103 transmits a payment request as well as the identification of the user and the amount of the transaction envisaged, to the data server 105, by means of the telecommunication line 106. In the course of a test 1006, the data server 105 determines whether the amount of the transaction envisaged is greater than a predetermined amount.

When the result of test 1006 is negative, an operation 1008 is carried out (see below).

When the result of test 1006 is positive, a data server 105 searches, in the course of an operation 1007, in its database of subscribers, the number of the bank card corresponding to the identification transmitted and carries out a request for bank authorization to a server of a bank where the user has the account with which is connected this payment card.

In the course of a test 1009, the server of the bank determines, according to rules known per se, whether the transaction envisaged is authorized or not. When the result of the test 1009 is negative, a refusal is indicated to the user, in the course of an operation (not shown), by means of the information server 103 and the user terminal 101.

When the result of the test 1009 is positive, the data server 105 receives, in the course of operation 1008, from the bank server, a payment authorization, according to known bank procedures.

In the course of operation 1008, the unique address of the receiver 111 is determined: it is representative, in the database 107, of the identification transmitted by the information server 103 to the message server 109, in the course of operation 1001.

Then, the operations 708 and the following illustrated in FIG. 7, are carried out.

However, in the embodiment shown in FIG. 10, when the result of the test 712 is positive, the data server 105 validates the payment carried out, then returns a payment approval to the server 103, accompanied by the address of the subscriber to the telephone service (at the end of the telephonic computation period of the trustee, this payment being effectively carried out between the bank entities of the purchaser and the trustee, according to known techniques. The same is true at the end of the payment period, the trustee carries out the payment to the merchant and subtracts as the case may be the service charge), then resumes the operation of presenting commercial offers.

In return, when the result of the test 712 is negative, the data server 105 transmits to the user an error message and invalidation of the payment, stating as the case may be a cause of a failure (too much time elapsed between the transmission of confidential information and its reception, . . . ) and the payment is not carried out.

Finally, the end of the session is of known type.

Figure 11:
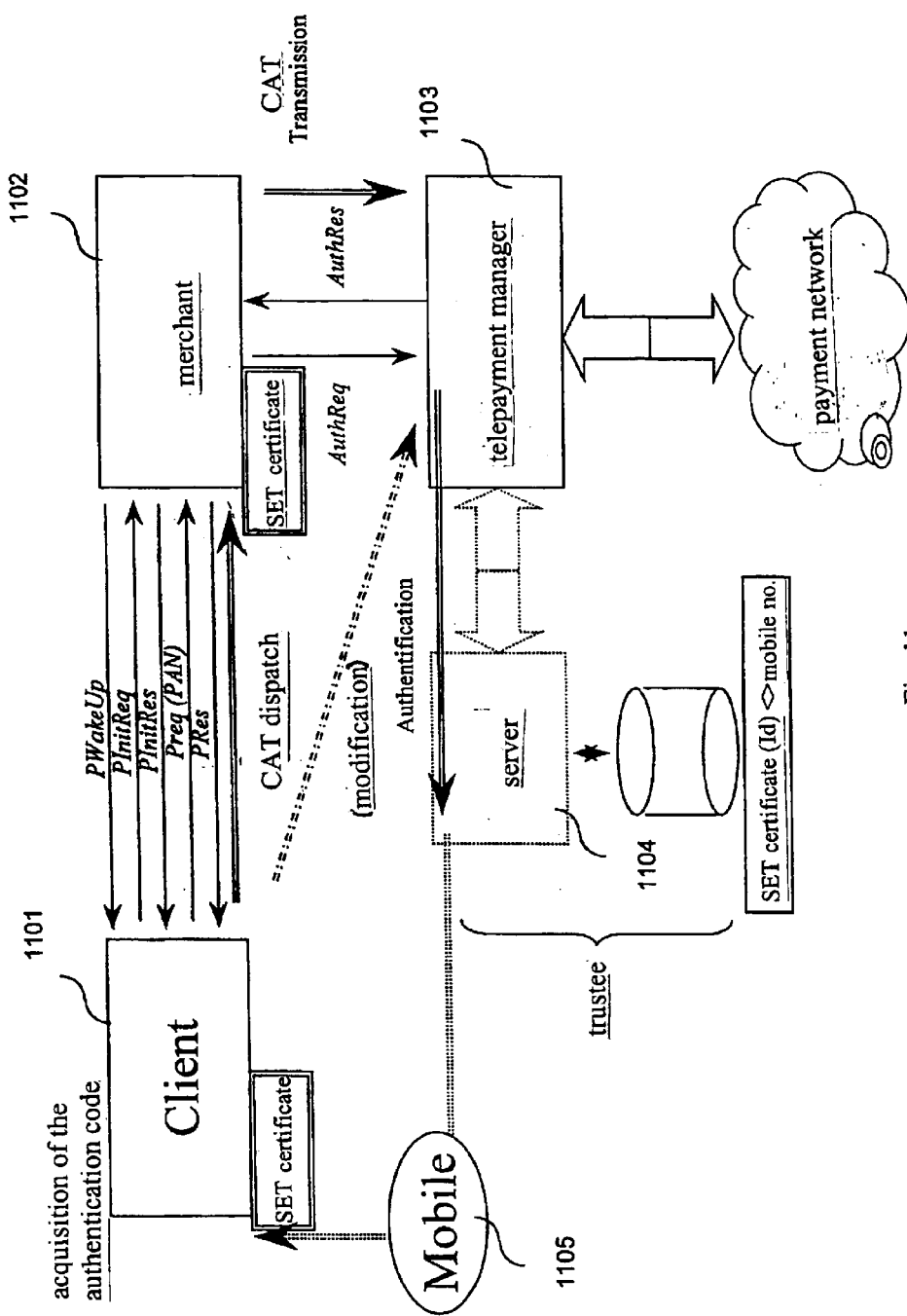
FIG. 11 shows schematically communications of messages practiced by the use of the present invention in combination with a known payment protocol under the name of "SET" (acronym of "Secure Electronic Transaction")

In FIG. 11, there is seen a diagram of the payment system according to the present invention using payment protocols known as "SET" (acronym of "Secure Electronic Transaction"). So as better to understand this type of transaction, the reader should refer to version 1.0 of the specifications of the SET protocol, published May 31, 1997. This version is incorporated here by reference.

It will be recalled that the VISA (trademark) and MASTERCARD (trademark) enterprises are associated with each other to define a common standard of payment by bank cards through open networks: the SET protocol.

The principal objectives of this SET protocol are as follows: - to render easy and rapid the development of electronic commerce, to create confidence in the network between the purchaser and the seller by means of an exchange of certificates, to separate the Internet network from the bank network, to guarantee the integrity and confidentiality of the transactions thanks to the encoding of the messages, to ensure interoperability between open bank standard and non-proprietary solutions, to carry out already existing standards.

The principles and operation of the SET protocol rely on three important principles:

the Payment Gateway, which ensures that the Internet domain will be sealed off from the bank domain, the certificates which are public keys which serve to authenticate the different actors entering into the transaction (client-bearer, merchant, Payment Gateway), the trustee who certifies the public keys which then become certificates.

The whole of the SET system rests on the use of certificates. The trustee certifies the public keys of the client-bearers, of the merchants and the Payment Gateway. The trustee is itself the object of a certification. There is thus a cascade system, wherein a trustee at a higher level certifies a trustee at a lower level. This system is hierarchical and, at the summit, is located the supreme authority which is known by all and which does not to authenticate itself. The interest in such a hierarchy is to delegate the work of certification, whilst guaranteeing the whole of the system.

1) For his enlistment, the client obtains his key by using a specific software which will be integrated into the navigator, known to those in the art under the name of "browser". He enters his bank card number into the program. The latter gives a receipt which the client must carry to one of the VISA or MASTERCARD enterprises, the latter returning a certificate containing a key which will remain inscribed in the software stored at the client station.

2) For the transaction:

the bearer consults the catalog on the server and makes his choice. The merchant server then sends to the client a virtual order (Order Information "OI") which contains the information on the product and the amount, as well as the certificate and public key of the merchant and of the Payment Gateway;

the client sends to the merchant server his certificate and his public key. Therefore, having each other's certificate, they can proceed to their mutual identification;

the client then creates a PI (acronym of "Payment Information"). This PI contains information relative to the bank system, which is sent exclusively to the Payment Gateway. For this reason, the client numbers the PI with the public key of the Payment Gateway. This operation concluded, the client assembles the OI and the PI and signs the whole with his private key. This package is sent to the merchant server.

the merchant server is able to verify the validity of the package from the public key of the client. He can thus be sure that the client has not modified the OI. However, it is impossible for him to read the information of the PI. The commercial server signs in his turn, the package received and transmits it to the Payment Gateway. The order information emitted by the merchant server and the payment order emitted by the bearer are connected in an inseparable manner by means of this dual signature.

the Payment Gateway verifies the certificates, the dual signature and the agreement between the order information (OI) and the payment order (PI). It thus serves as an interface with the traditional world of card payment.

If the usual conditions of card payment are fulfilled, it confirms the transaction to the merchant server.

The advantage of this protocol is that, thanks to the certificates, the client and the merchant server can mutually identify themselves before even carrying out the transaction.

The drawbacks of these protocols are:
the multiplication of the trustees is difficult to manage, protection is only by software,
the certificates are stored on machines of the client's. Hence, strictly speaking, the authentication does not concern the client but rather his computer.

With respect to FIG. 11, there will be seen practice of the invention in the framework of the payment solution SET. This protocol uses a tripartite relationship, client computer 1101—merchant server 1102—Payment Gateway 1103. Each of these entities receives SET certificates generated by a certification manager (not shown). At the date of filing the present application, the SET protocol does not permit reliable authentication of the purchaser, except by installing a memory card reader.

In a first instance, a client institutes the purchase by selecting goods or services on a commercial site of a computer network. The client then triggers the payment by validating the purchase (for example by clicking on a "purchase validation" icon).

Then the client must type in a static password to initiate payment, by decoding the SET certificate stored on his computer.

According to a variation (not shown), an operative mode consists in not using a certificate (according to the SET protocol operating in "2 Kp" mode). In this case, no certificate is exchanged and only authentification of the client is necessary, according to the present invention (below).

The exchanges "client computer—shopping server—Payment Gateway" are initiated so as to determine the parameters of communication (frames called "PWakeUp", "PInitReq" and "PInitRes" in the specification of the SET protocol), the data contained in the client's certificate are recovered at the level of the Payment Gateway (frame Preq(PAN)) which decode them and address an authentication request of the client to the authentication server 1104.

This server authenticates the transaction by computing an authentication code of the transaction ("CAT") and sends it, by means of a short message (known to those in the art as "SMS", acronym for "Short Message System") to the client identified by his corresponding mobile phone number 1105, in the subscriber database, to the identification decoded in the SET client certificate which is received by the Payment Gateway.

According to a modification (not shown), the telephone number of the subscriber, on the second network, is included, coded, in a field of the SET client certificate. In this case, it is not necessary to have a database carrying out the correspondence between the mobile number of the subscriber and his identification. Upon reception of the client certificate on the Payment Gateway, the latter decodes the certificate and uses directly the number of the mobile phone contained in the certificate to address the authentification code of the transaction of the client. This principle of operation facilitates the interoperability between the telecommunication and bank operators.

The client then receives an authentication code of the transaction in the form of a confidential message, according to the present invention. He acquires this message on his computer in an authentication field provided for this purpose.

The authentication code of the transaction is then sent either by means of the shopping server, directly to the Payment Gateway, or is submitted to the authentication server which validates it and decodes the payment.

According to a modification (not shown), the client receives in the form of a short SMS message the amount of the transaction in clear, associated with the identification code of the transaction so that he verifies the integrity of the amount of his purchase.

Figure 12:
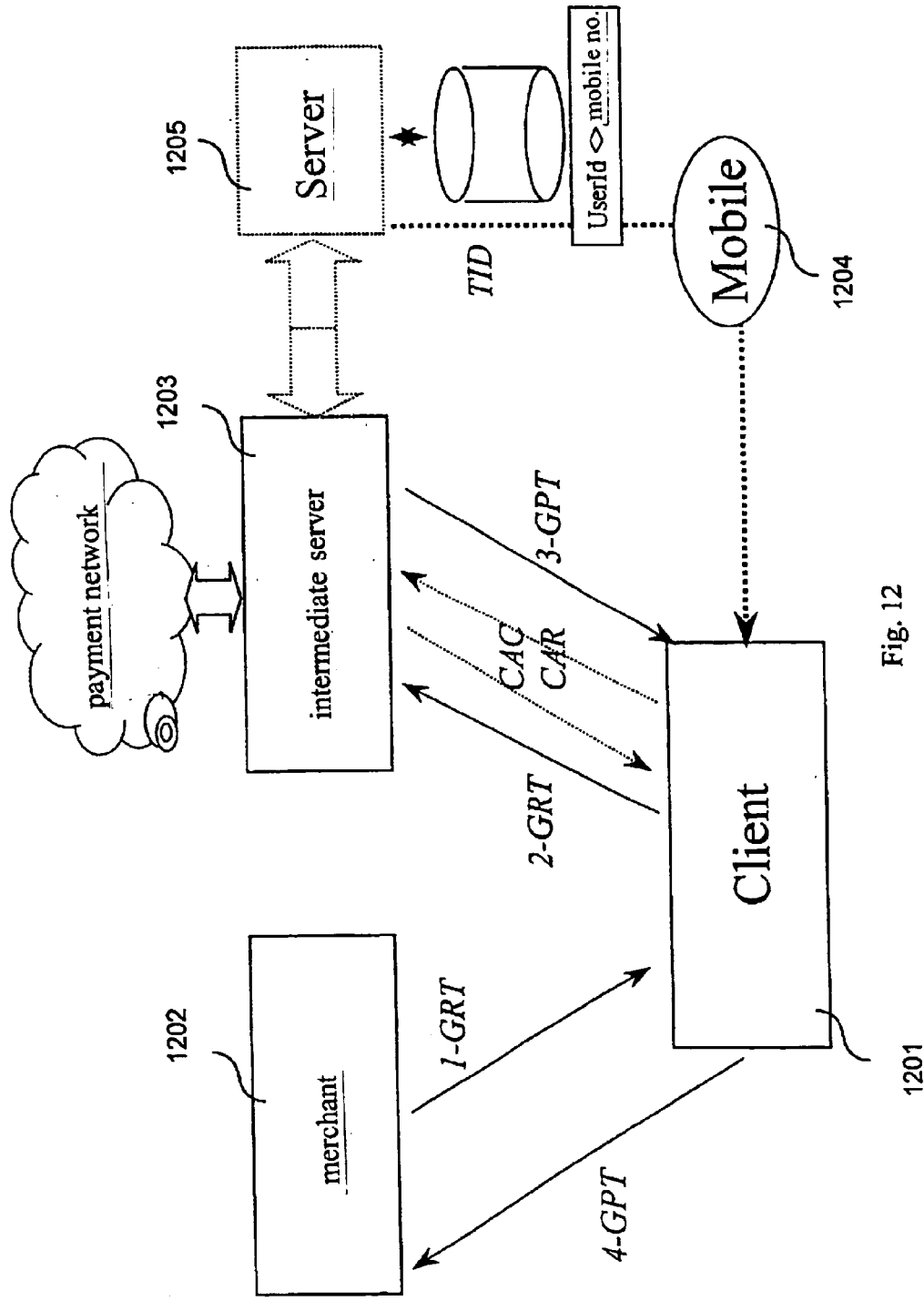
FIG. 12 shows schematically communications of messages practiced by the use of the present invention in combination with a payment protocol known to those skilled in the art under the name Globeid (trademark) or Kleline (trademark)

In FIG. 12, there is seen the use of the invention in the field of the solution of payments known to those in the art Globeid (trademark) or Kleline (trademark).

This system relies on the principle of virtual money-carrier (VMC). It thus is a matter of having the client first deposit and then be debited according to his purchases. The transactions are totally transparent to the client. This is the only case in which the client and shopping server have no direct relationship.

The use the Globeld system, it suffices to telecharge an interface (called "Klebox", trademark of Kleline) and to open an account addressing it to GlobeOnLine (trademark) or Kleline. The client can open several virtual money-carriers.

Opening the virtual money-carriers can take place instantaneously on-line. In this case, the bank coordinates are encoded (RSA technology) and sent by means of the Internet network. They can also be transmitted by telephone, telecopy or mail. In response, the service using this solution attributes to the client a money-carrier number and a confidential code.

Upon opening the virtual money-carrier, the client carries out two operations: he gives his bank card number and the other necessary information, then pays, on the virtual money-carrier, an amount of his choice. The client can consult the condition of his virtual money-carrier and deposit new sums of money at any time. It is also possible for him to withdraw all or part of what he has.

The virtual money-carrier is connected to one or several bank cards. The client has the possibility of personalizing his bank cards, by giving them names, so as not to confuse them. Double-checking techniques ensure that a card corresponds only to a single person.

The transaction type takes place as follows:
the client browses on the shopping server. When a product interests him, he clicks above and declares himself ready to purchase by sending a purchase order to the shopping server;
the latter emits a receipt with a destination to the Globeld server. This receipt comprises on the one hand, the nature and amount of the purchase and, on the other hand, the number of the virtual money-carrier of the merchant. It is all signed from the confidential code of this latter. Then, Globeld verifies this ticket (the shopping server is thus authenticated) and this fact appears on the screen of the computer of the client;
the client electronically signs this ticket with his secret code and returns it to Globeld;
Globeld then authenticates the client with his public key and validates the transaction. If the client has decided to pay with his card, the validation takes place at the bank network with, if desired, a request for authorization to the bank card network. If the client uses his virtual money-carrier, the latter is debited with the amount of the transaction;
the client's computer finally emits a cash voucher to the shopping server (validating the transaction) which then sends the merchandise.

All the communications in the transactions are coded with the help of asymmetric keys of 512 bits.

The drawbacks of this protocol are that, for the merchant, it is necessary to have a virtual money-carrying number and a confidential code.

With regard to FIG. 12, it will be noted that, in a particular embodiment of the present invention, used in combination with the Globeld solution:

1. The client computer 1201 selects goods and services on the shopping site 1202 and validates its purchase.

2. The shopping server then requires a "ticket" (receipt) from the client computer ("GRT1" exchange in FIG. 12).

3. The client computer submits, in its turn, this request to the intermediation server 1203 ("GRT2").

4. The authentication phase is then used ("CAC/CAR" exchange) with a dynamic code called "TID" (for "Transcode Identifier") generated by the intermediation server and sent by means of a telecommunication network, in the form of a short SMS message, addressed to the mobile phone 1204 whose number corresponds to the subscriber identified by the "userld" identification of the client, stored in the database 1206 of the authentication server 1205.

According to a modification (not shown), the TID dynamic code is calculated and sent directly by the telecommunication operator. In this case, the intermediary server transmits the information necessary for calculating the TID dynamic code, to the telecommunication operator.

According to another modification (not shown), the client receives, in the form of a short SMS message, the amount of the transaction, in clear, associated with the authentication code of the transaction so that he can verify the integrity of the amount of his purchase.

5. The transaction authentication code received by the mobile phone of the client is acquired on the computer used by the client and the information as to the transaction are added to the TID dynamic code and are sent to the intermediary server ("IS") which verifies the validity of the TID dynamic code and validates, with the authentication server, the transaction authentication code received from the client's computer.

6. The intermediary server thus delivers a receipt ("GPT 3" exchange) to the client's computer, which then sends it to the shopping server ("GPT 4" exchange).

The "SSL" (Secure Socket Level) protocol is a secured communication protocol between two entities. The reader can refer to the version 3.0, of the specifications setting forth this protocol, the version of March, 1996. This version is incorporated herein by reference.

The SSL protocol is a protocol developed by NETSCAPE. The initial negotiation phase permits authentication of the shopping server and, optionally, of the client. Once this phase is concluded, the exchanges are encrypted with the key generated by the client's computer.

Thus, the security protocol SSL encodes the data, authenticates the server and ensures the integrity of the messages for a TCP/IP (Transport Telecommunication Protocol/Internet Protocol") connection:

particularly, the encoding of the data (RC4), the authentication of the shopping server for the client (different methods of asymmetric coding), the integrity of the data (MD2, MD5), the non-renounceability of the exchanges, and optionally, the authentication of the client for the server.

As a practical matter, the SSL protocol gives a security of the "handshake", type, to begin any TCP/IP connection. The handshake permits, for the client's computer and the shopping server, to agree on the level of security to be used and to fulfill the conditions of authentication for the connection. Then, the sole role of the SSL protocol consists in encoding and decoding the flow of octets of the application protocol taking place (for example "HTTP", acronym for "HyperText Transfer Protocol"). This means that all the information contained in the HTTP requests and responses are entirely encoded, including the URL (acronym for universal resolution location) that the client's computer requires, the content of all the submitted formulas (such as the credit card numbers), any information relative to the HTTP access authorization (names of the user and password) and all the data returned by the server to the client's computer.

SSL certificates can be edited by an entity accredited both by the client and the merchant. In the usual manner, the client does not possess a certificate.

Figure 13:
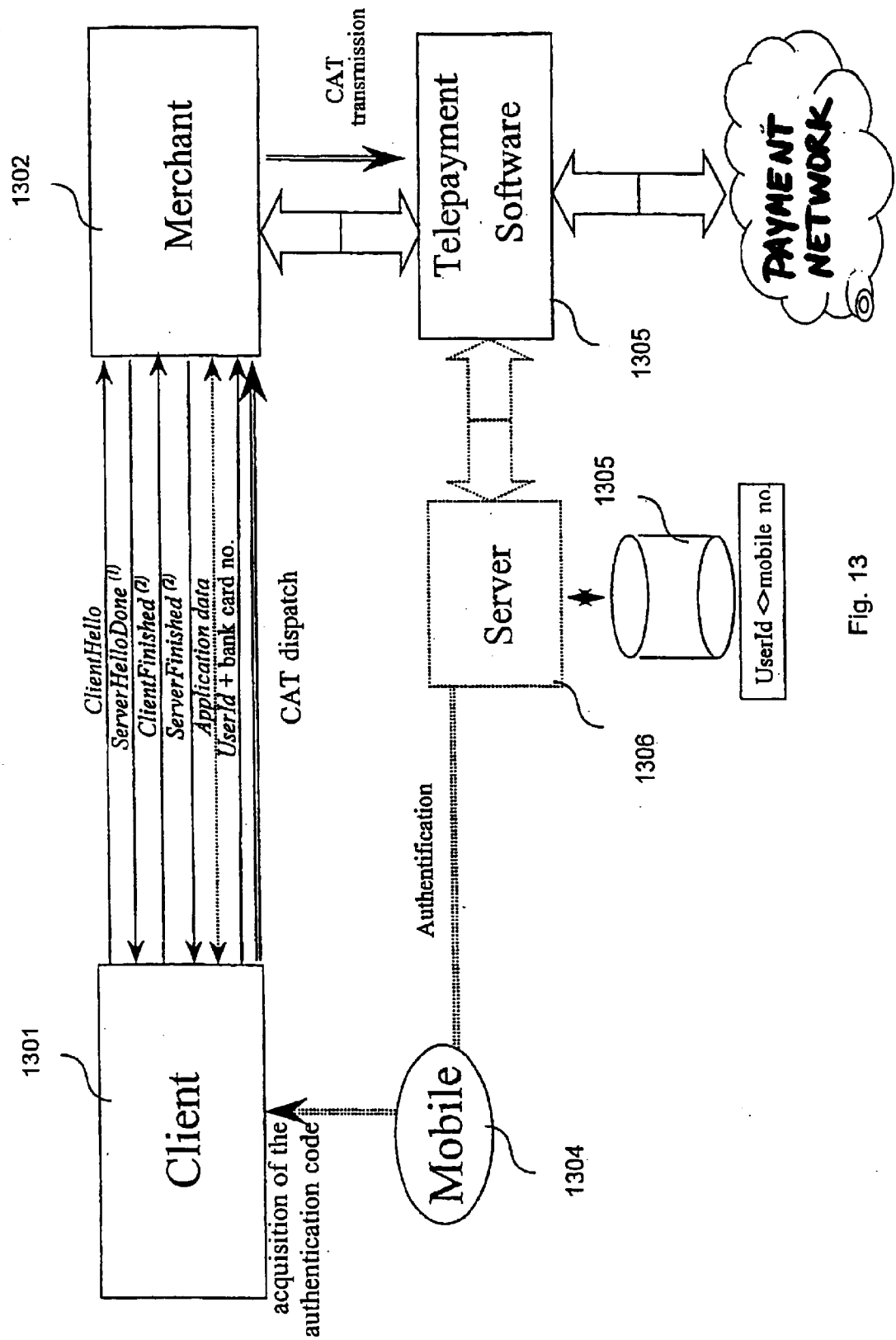
FIG. 13 shows schematically communications of messages used in an application of the present invention in combination with a known secured communication protocol under the name of "SSL" (acronym of "Secure Socket Level").

There is seen, in FIG. 13, in a particular embodiment of the present invention, in combination with the payment scheme SSL, that:

the client computer 1301 first initiates the purchase, by selecting its goods or services on the shopping site 1302 or the desired shopping mall;

the start of payment is activated by a validation of the client's purchase (for example, pushing a "purchase validation" key);

then the communication SSL opens with an exchange between the client computer 1301 and the shopping server 1302, of frames which permit regulating the parameters of the communication (protocol version, session number, retained algorithm coding, compression method, reciprocal authentication and use or not of algorithm-based coding with public or private keys). A master key is exchanged, encoded, with the private key of the merchant, the client's computer decoding it with the public key of the merchant and then generating a session key based on this master key. This operation is reproduced on the shopping server so as to have, for both sides, the same session key. Said session key serves to encode the communication between the client's computer and the shopping server;

the client keys in a "Userld" identification permitting identifying it for the shopping server or the shopping mall;

the shopping server or the mall transmits the "Userld" identification and the parameters of the transaction, to the telepayment software 1303 which computes the authentication code of the transaction and sends it, by means of a short SMS message, to the client identified by his mobile phone number 1304 corresponding to this "Userld" identification, in the subscriber base 1305 of the authentication server 1306;

A variation consists in using the SSL certificate on the client's computer, particularly by incorporating therein, during its generation by the accreditation server, the mobile number of the user, the bank card number and the limit date for validity of the bank card. During exchanges of the beginning of the SSL connection, the shopping server decodes the information of the client's certificate and particularly the mobile number which serves to send the authentication code of the client transaction. In this modification, it is possible to avoid the subscriber database in the authentication server.

Another variation consists in that the client sends directly the bank card number and the expiration date of this latter. In this case, the shopping server computes the authentication code of the transaction and recovers the mobile number of the client in the database indexed by bank card number. Then the authentication code of the transaction is sent to the client by means of his mobile phone.

the client identified by his mobile phone receives the authentication code of the transaction on his mobile phone, then acquires it in the authentication field on his PC screen;

the authentication code of the transaction is sent by means of the shopping server or the mall, then to the authentication server which thus validates the authentication code of the transaction and triggers payment.

a modification consists in adding, in addition to the amount of the purchase, the references of the product purchased, the quantities, . . . , in clear, with the authentication code of the transaction by sending the short SMS message, during the transmission over the mobile phone of the client.

According to a variation (not shown) of each of the embodiments of the present invention, the shopping server carries out a selection operation of the transmissions which are securitized according to the present invention. In the course of this operation of selection of transmissions, as a function of predetermined criteria, the transmissions are classified into two groups, one relating to the so-called "to be secured" transmission and the other to the so-called "normal" transmissions. The transmissions "to be secured" are processed as described above, whilst the so-called "normal" transmissions require no more than an operation of transmission over a communication support. The so-called "normal" transmissions are in fact according to the processes known to the prior art.

For example, in the case of the embodiment shown in FIG. 10, the operation of selection can be carried out in the course of the operation 1005 or in the course of operation 1008, by taking as selection criteria the amount of the transaction, and by comparing it to a transaction limit amount. The so-called "to be secured" transmissions are thus those with which are associated transaction amounts greater than the limit amount.

The different embodiments of the present invention (authentication, certification or the message and electronic on-line payment) can be combined so as to produce specific applications corresponding to the requirements of the operator of the service.

The invention is particularly applicable:

to the control of access to a computer site (for the internal security of an enterprise, for teleworking in an enterprise, for access to protected databases . . . ), to the transmission of confidential information to the proper parties (for electronic mail, secured and/or registered telecopies, for the certification estimates or of order information . . . ), to the on-line payment (for electronic commerce, for the distribution of information or of software, . . . ), to the certification of messages (for long distance declaration, for home banking, . . . ), to the transmission of personalized commercial propositions (for secured letter boxes, . . . ), to the taking of bets on-line (for lotteries or casinos, race courses, . . . ), to the control and reservation of a television program (for pay-per-view television), to sending information or to remote charging for software on demand, for the on-line reservation of services, or to opening of virtual electronic account.

Several of these applications are described in detail below, by way of example.

For use as access control using the present invention, the network used can be a network known as "Intranet" or a worldwide network known as "Internet". The object of this application of the invention is to be certain that the user is an entitled person.

In this application:

the user identifies the service, he identifies himself by supplying an identification, he receives, by means of a second communication support (for example portable phone or pager), a single use password, he keys this single use password onto the keyboard of his terminal, then if the authentication is made, he has access to the resource in question (for internal safety of an enterprise, for teleworking . . . ).

For an application for electronic courier transmission or registered telecopying using the present invention, the network used can be a switched network. The objectives of this application of the invention are:

to ensure that the person to whom the secured message is addressed (the "destination"), receives it properly and to deliver a message certificate to the sender and to the addressee of this secured message.

In this application:

the user who emits the secured message composes the number of a specialized service for using this application, he identifies himself by supplying an identification, he keys in the coordinates of the destination user (telephone number, preferably portable, address, telecopier, . . . ), then he delivers his secured message (oral, written and/or by means of a telecopier), he receives, by means of a second communication support (for example a portable telephone or pager), a message certificate, he keys this message certificate into the keyboard of his terminal, in the first network, this message certificate is verified, then the addressed user:

is informed that a secured message awaits him (this operation is carried out by any known means (telephone, telecopier, courier, pager, electronic courier . . . ), he composes the number of the specialized service for using this application, he identifies himself by supplying an identification, he receives, by means of a second communication support (for example portable telephone or pager), a message certificate, and he types this message certificate into the keyboard of his terminal, on the first network, this message certificate is verified, the destination user of the secured message receives this latter, the sending user is informed that the secured message has been retrieved by the destination.

The specialized service preserves a record of each of these certificates thus delivered.

For an application to teller declaration (which is to say remote declaration) using the present invention, the first network used can be a worldwide network known as the "Internet". The object of this application of the invention is to permit an immediate official administrative declaration, to deliver a receipt to the user and to be assured of the identity of the declarant.

In this application:
the user who emits the declaration is connected to an administrative service suitable for this application (see below),
he identifies himself by supplying an identification,
he carries out said declaration or fills out an administrative form,
he receives, by means of a second communication support (for example portable telephone or pager), a message certificate, and
he keys this message certificate into the keyboard of his terminal.

For an application of the invention to on-line purchases or payments, using the present invention, the network used is a worldwide network known as the "Internet" and a software used by the user's computer permits encrypting an account number or bank card number (for example with encryption software "SSL" or "SET"). The object of this use of the invention is to be able to pay on-line by authenticating the person who carries out the transaction.

In this application:
the user contacts a "shopping mall", which is to say an assemblage of merchants supplying goods, services or information,
he identifies himself by supplying an identification,
he selects a transaction he wishes to carry out,
he indicates a payment mode (bank card, for example),
he sends to the server of the mall his card number and the date of expiration of this card, under the encryption protocol SSL,
the server generates a transaction certificate to which it associates the amount of the transaction, in clear,
the user receives, by means of a second communication support (for example a portable telephone or pager), this transaction certificate and the amount of the transaction in clear,
he verifies the integrity of the amount,
he keys these elements into the keyboard of his terminal, and
the transaction is then carried out according to known banking procedures.

For an application using the present invention in which the information (text, images, graphics, sounds) and/or the software, are supplied on demand, the network used is the worldwide network known as the "Internet". The object of this application of the invention is to cause the person who has access to a value-added resource to pay for it and to give him the required service (transmission of information or software) in real time.

In this application,
the user contacts the service supplier,
he identifies himself by supplying an identification,
he chooses information or software which interests him,
the service supplier indicates the price of the service in question,
the user confirms his desire to purchase it,
the user receives, by means of a second communication support (for example portable telephone or pager), a certificate of the corresponding transaction, of the amount of the transaction, in clear, and
he verifies the integrity of the payment,
he keys the certificate of transaction into the keyboard of his terminal,
the transaction certificate is verified,
he receives the information or software in question, and
he is billed on the monthly bill of his telecommunication service operator, or by his supplier of access to the network, for example, as a function of his use.

For remote betting using the present invention, the network used is the worldwide network known as the "Internet". The object of this application of the invention is to make sure that the person remotely betting is entitled to do so and that he has first done the necessary to place this bet.

In this application:
the user opens and deposits in his account with the service operator, either by depositing a sum in the account from any sales point or by check, or by using the same method as in the applications of the invention recited above for on-line payment,
then, when the user wishes to take part in a game or place a bet:
he identifies himself by supplying an identification, and/or a subscriber number,
he selects a game in which he desires to play,
the user receives, by means of a second communication support (for example portable telephone or pager), a certificate of the associated transaction of the bet, in clear, and
he verifies the play and the bet,
he keys the transaction certificate into the keyboard of his terminal,
the transaction certificate is verified (game, bet, numbers, a combination).

For an application in supplying personalized offers using the present invention, the network used is the worldwide network known as the "Internet". The object of this application is to identify the requirements of the consumer upstream in advance of the purchase and to give him personalized offers corresponding to his requirements.

In this application, during its first connection:
the customer gets in touch with the service,
he identifies himself by supplying an identification and/or a subscriber number,
he receives, by means of a second communication support (for example portable telephone or pager), a single use password,
he keys the single use password into his keyboard of his terminal, and
he fills out a marketing questionnaire permitting determining the types of commercial propositions to be sent to him.

When a commercial proposition corresponding to his requirement is sent to him, the customer receives a "alert" message, by means of the second communication support. In the course of this second connection:
the customer then gets in touch with the service,
he identifies himself by supplying an identification and/or a subscriber number,
he receives, by means of a second communication support, a message certificate,
he keys the message certificate into the keyboard of his terminal, he has access to the personal and confidential mailbox which contains the commercial proposition, he studies the proposition.

What is claimed is:

1. A method for transmission of a secured electronic message, comprising the steps of:

receiving by an information processing system, from a user, via a communication network, the message to be transmitted, an identification of the user, and an identification of a destination for said message;

opening a communication session between a remote communication device corresponding to the identification of the destination of said message, and the information processing system;

generating, by said information processing system, a first confidential information for single use that cannot be used except during said communication session;

and, during said communication session:

transmitting, by the information processing system, of the first confidential information via a first transmission support, receiving, by the information processing system, said first confidential information from a second transmission support different from the first transmission support, verifying the first confidential information by said information processing system, and if the first confidential information is verified, supplying the secured message, by the information processing system, to the remote communication device corresponding to the identification of the destination of said message, the method further comprising the step of authenticating said user, wherein the authentication step comprises the steps of:

generating, by said information processing system, a second confidential information for single use;

supplying to said user, by said information processing system, of the second confidential information, on a third transmission support, receiving, by the information processing system, of the second confidential information, on a fourth transmission support different from the third transmission support, and verifying the second confidential information by said information processing system.

2. The method according to claim 1, further comprising the step of informing said user of the supply of the secured message to said destination.

3. The method according to claim 1, further comprising the step of delivering to said destination a certificate which identifies said user.

4. The method according to claim 1, further comprising the step of memorizing at least one record of at least one operation, in the information processing system.

5. The method according to claim 1, wherein the first transmission support is a wireless support.

6. The method according to claim 1, wherein the second transmission support is the Internet.

* * * * *